US012794914B2

(12) United States Patent
Pourahmadi et al.

(10) Patent No.: US 12,794,914 B2
(45) Date of Patent: Nov. 10, 2026

(54) ENHANCED ANOMALY DETECTION FOR DISTRIBUTED NETWORKS BASED AT LEAST ON OUTLIER EXPOSURE

(71) Applicant: Telefonaktiebolaget LM Ericsson (publ), Stockholm (SE)

(72) Inventors: Vahid Pourahmadi, Waterloo (CA); Hyame Alameddine, Montreal (CA); Mohammad Ali Salahuddin, Milton (CA); Raouf Boutaba, Waterloo (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 249 days.

(21) Appl. No.: 18/562,496

(22) PCT Filed: May 20, 2022

(86) PCT No.: PCT/IB2022/054764

§ 371 (c)(1),
(2) Date: Nov. 20, 2023

(87) PCT Pub. No.: WO2022/243980

PCT Pub. Date: Nov. 24, 2022

(65) Prior Publication Data

US 2024/0250975 A1 Jul. 25, 2024

Related U.S. Application Data

(60) Provisional application No. 63/191,117, filed on May 20, 2021.

(51) Int. Cl.
*H04L 9/40* (2022.01)

(52) U.S. Cl.
CPC ...... *H04L 63/1425* (2013.01); *H04L 63/1458* (2013.01)

(58) Field of Classification Search
CPC ........................ H04L 63/1425; H04L 63/1458
See application file for complete search history.

(56) References Cited

U.S. PATENT DOCUMENTS 10,931,692 B1 * 2/2021 Mota .................... G06N 3/0455
11,829,866 B1 * 11/2023 Feinstein ............... G06N 3/045
(Continued)

OTHER PUBLICATIONS

International Search Report and Written Opinion dated Aug. 23, 2022 filed in PCT Application No. PCT/IB2022/054764 filed May 20, 2022, consisting of 17 pages.
(Continued)

*Primary Examiner* — Stephen T Gundry
(74) *Attorney, Agent, or Firm* — Weisberg I.P. Law, P.A.

(57) ABSTRACT

A method, system and apparatus for outlier exposure based anomaly detection for detecting anomalies in network traffic are disclosed. According to one or more embodiments, a central node is configured to train an Outlier Exposure (OE)-based autoencoder using unlabeled network data and labeled network attack data where the OE-based autoencoder is trained to reconstruct input data with an objective that is configured to minimize a reconstruction error on unlabeled network data and to maximize the reconstruction error on labeled network attack data, use the trained OE-based autoencoder to determine a reconstruction error on network traffic, and compare the determined reconstruction error to a threshold to determine if local network traffic is an anomaly.

29 Claims, 14 Drawing Sheets

(56) References Cited

U.S. PATENT DOCUMENTS

| | | | | |
|---|---|---|---|---|
| 11,853,853 | B1 * | 12/2023 | Beauchesne | G06F 18/2113 |
| 12,088,600 | B1 * | 9/2024 | Beauchesne | G06N 5/01 |
| 12,174,689 | B1 * | 12/2024 | Mozaffari | G06N 20/00 |
| 12,182,670 | B1 * | 12/2024 | Beauchesne | G06N 5/046 |
| 12,267,297 | B1 * | 4/2025 | Haefner | H04L 63/0209 |
| 12,267,345 | B1 * | 4/2025 | Erlingsson | G06F 9/5072 |
| 12,299,547 | B1 * | 5/2025 | Ogun | G06T 7/80 |
| 12,314,385 | B1 * | 5/2025 | Beauchesne | H04L 63/1425 |
| 2016/0352766 | A1 * | 12/2016 | Flacher | H04L 12/28 |
| 2019/0188065 | A1 * | 6/2019 | Anghel | G06F 11/0709 |
| 2020/0210782 | A1 * | 7/2020 | Servajean | G06N 3/09 |
| 2023/0188554 | A1 * | 6/2023 | Delpont | G06N 20/00 726/23 |
| 2023/0273994 | A1 * | 8/2023 | Mohammady | G06F 21/554 726/23 |
| 2023/0289340 | A1 * | 9/2023 | Cella | G06F 16/2455 |
| 2023/0370481 | A1 * | 11/2023 | Elyashiv | G06N 3/0475 |
| 2023/0370491 | A1 * | 11/2023 | Crabtree | H04L 63/102 |
| 2024/0080337 | A1 * | 3/2024 | Matefi | H04L 41/16 |
| 2024/0086944 | A1 * | 3/2024 | Zhang | G06N 3/045 |
| 2024/0113974 | A1 * | 4/2024 | Savarese | H04L 61/4511 |
| 2024/0152756 | A1 * | 5/2024 | Lakshmanan | G06N 3/084 |
| 2024/0187430 | A1 * | 6/2024 | Holbrook | G06N 5/01 |
| 2024/0187436 | A1 * | 6/2024 | Karin | H04L 43/026 |
| 2024/0224040 | A1 * | 7/2024 | Madi | H04W 12/12 |
| 2024/0275804 | A1 * | 8/2024 | Joshi | G06F 18/217 |
| 2024/0396907 | A1 * | 11/2024 | Beauchesne | H04L 63/1416 |
| 2025/0005580 | A1 * | 1/2025 | Wong | G06Q 40/02 |
| 2025/0047298 | A1 * | 2/2025 | Cooper | G06N 20/00 |
| 2025/0103966 | A1 * | 3/2025 | Beauchesne | G06N 20/00 |
| 2025/0118083 | A1 * | 4/2025 | Mohseni | G06F 18/2433 |
| 2025/0175456 | A1 * | 5/2025 | Crabtree | G06N 7/01 |
| 2025/0240316 | A1 * | 7/2025 | Savalle | H04L 63/1425 |

OTHER PUBLICATIONS

Rey et al., Federated Learning for Malware Detection in IoT Devices; Cornell University Library, Apr. 15, 2021, consisting of 8 pages.

Savic et al., Deep Learning Anomaly Detection for Cellular IoT with Applications in Smart Logistics; IEEE Access, IEEE, USA, Special Section on Advanced Internet of Things for Smart Cyber-Physical Infrastructure Systems, Apr. 13, 2021, consisting of 14 pages.

Sadaf et al., Intrusion Detection Based on Autoencoder and Isolation Forest in Fog Computing; IEEE Access, IEEE, USA, Sep. 9, 2020, consisting of 10 pages.

Salahuddin et al., Time-based Anomaly Detection using Autoencoder; 16th International Conference on Network and Services Management (CNSM) IFIP, Nov. 2, 2020, consisting of 10 pages.

Ruff et al., Deep Semi-Supervised Anomaly Detection; Published as a conference paper at ICLR 2020, Cornell University Library, Jun. 6, 2019, consisting of 24 pages.

Nguyen et al., DIoT: a federated Self-learning Anomaly Detection System for IoT; Cornell University Library, Apr. 20, 2018, consisting of 22 pages.

Hendrycks et al., Deep Anomaly Detection with Outlier Exposure; Published as a conference paper at ICLR 2019, Cornell University Library, Dec. 11, 2018, consisting of 18 pages.

Yang et al., DDOS Attacks Detection with AutoEncoder; NOMS 2020-2020 IEEE/IFIP Network Operations and Management Symposium; IEEE 2020, consisting of 9 pages.

Ruff et al., Rethinking Assumptions in Deep Anomaly Detection; arXiv preprint; arXiv:2006.00339 v1 [cs.LG] May 30, 2020, consisting of 22 pages.

Sharafaldin et al., Developing Realistic Distributed Denial of Service (DDoS) Attack Dataset and Taxonomy; 2019 International Carnahan Conference on Security Technology (ICCST), IEEE 2019, consisting of 8 pages.

3GPP TS 23.288 V16.6.0 (Dec. 2020) 3rd Generation Partnership Project; Technical Specification Group Services and System Aspects; Architecture enhancements for 5G System (5GS) to support network data analytics services (Release 16), consisting of 67 pages.

3GPP TS 33.521 V0.2.0 (Nov. 2020) 3rd Generation Partnership Project; Technical Specification Group Service and System Aspects; Security Assurance Specification (SCAS) for the Network Data; Analytics Function (NWDAF) network product class; (Release 17), consisting of 9 pages.

ETSI GS NFV-SEC 013 V3.1.1 (Feb. 2017) Network Functions Virtualisation (NFV) Release 3; Security; Security Management and Monitoring specification, consisting of 54 pages.

* cited by examiner

ENHANCED ANOMALY DETECTION FOR DISTRIBUTED NETWORKS BASED AT LEAST ON OUTLIER EXPOSURE

CROSS-REFERENCE TO RELATED APPLICATIONS

This application is a Submission Under 35 U.S.C. § 371 for U.S. National Stage Patent Application of International Application No.: PCT/IB2022/054764, filed May 20, 2022 entitled “ENHANCED ANOMALY DETECTION FOR DISTRIBUTED NETWORKS BASED AT LEAST ON OUTLIER EXPOSURE,” which claims priority to U.S. Provisional Application No. 63/191,117, filed May 20, 2021, entitled “ENHANCED ANOMALY DETECTION FOR DISTRIBUTED NETWORKS BASED AT LEAST ON OUTLIER EXPOSURE,” the entireties of both of which are incorporated herein by reference.

FIELD

The present disclosure relates to wireless communications, and in particular, to an anomaly detection model based at least on Outlier Exposure (OE) capability for anomaly detection.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations and mobile wireless devices (WD), as well as communication between network nodes and between WDs.

The increase in cybercrimes in recent years imposes the need for intelligent security controls that are capable of coping with the complexity and heterogeneity of the emerging Fifth Generation (5G) networks. Such controls include, but are not limited to, anomaly detection capabilities that are able to detect anomalies along with zero-day attacks. These capabilities are deemed intrinsic to the network edge (e.g., edge servers) to offer a first line of defense against attacks and prevent them from exposing the whole network infrastructure to a higher risk.

Edge Computing and its Vulnerabilities

The development of cloud-computing like capabilities at the edge of the network is motivated by the recent advancements in 5G networks and Internet of Things (IoT) technologies. The promise of low-latency and seamless connectivity in 5G networks is coupled with the increase in the number of IoT devices supporting different kind of services and applications, such as augmented and virtual reality, remote surgeries, among others. IoT devices fail to meet the performance requirement of these applications due to their limited resources in terms of computing, storage, and short battery life. Further, the considerable amount of data they generate brings an extra burden to the existing wireless network infrastructure. By enabling distributed computing and storage capabilities at the edge of the network, IoT devices can meet the challenging requirements of their applications by offloading their tasks to the edge. Edge servers can be either deployed at 1) business premises (e.g., company buildings) closer to the wireless device, known as cloudlets, 2) or at fog nodes such as access points, edge routers, switches and gateways, 3) or they can be co-located with cellular network nodes leveraging the Multi-access Edge Computing (MEC) paradigm.

Nonetheless, while edge servers serve IoT devices, they can be subject to attacks originating from the latter. In fact, IoT devices extend the attack surface and put the network at risk. IoT devices are highly vulnerable to malware, allowing attackers to use them as part of a botnet in order to launch different kinds of attacks toward the edge of the network. The security of the network edge is not only threatened by vulnerable IoT devices but is also subject to attacks targeting every asset of the edge, including its infrastructure and the virtualization technologies running on top of edge servers, such as those related to hypervisors, virtual machines and containers. In addition, edge servers are owned, managed and used by different entities and support multiple tenants. An attack targeting any of these entities/actors hinder the security of the entire edge and beyond. An attack on an edge server impacts all the services provided at the geographical location covered by that edge. However, as edge servers can cooperate with each other and with the central cloud, an attack towards an edge server can escalate to other edges and potentially to the central cloud as well. Thus, edge servers should be equipped with anomaly detection mechanisms to detect attacks as soon as possible and take the appropriate measures to prevent and limit the damage they entail.

Anomaly Detection at the Edge (e.g., at the Edge Server/Node)

Anomaly detection refers to the identification of unusual events that do not conform to normal behavior. Machine Learning (ML) has been widely adopted for anomaly detection given its ability to identify hidden patterns in “training” data, deducing knowledge and improving it over time and with experience. Applying machine learning for anomaly detection at the edge of the network can be performed either through centralized or distributed solutions.

Centralized Anomaly Detection

Two centralized solutions for anomaly detection at the edge are known:

Cloud-centralized: The cloud-centralized solution consists of training a ML model with the data collected from all the edge servers. Once trained, the model can then be deployed at each of the edge servers to enable the detection of anomalies at the edge. This solution requires sharing the data of each edge with a third party, a central cloud, for example. This sharing violates regulations related to user's privacy. Further, the data at the edge can be very large and it might be impractical to share it as this leads to high communication overhead. Nonetheless, the cloud-centralized model provides a high accuracy as it is trained on a large volume of data leveraging the knowledge of all the edges.

Edge-silo: In order to preserve privacy, one solution can leverage the data at each edge to train a ML model independently from the other edges. This approach is referred to as edge-silo as the model is specific to the considered edge server. While this approach preserves the privacy given that the data at the edge is not shared with any third party, this approach remains specific to the experience gained from the local edge data and does not leverage any knowledge gained from other edges.

Federated Learning (FL) Anomaly Detection

In order to help overcome the limitations of the cloud-centralized and edge-silo solutions, a distributed approach, namely Federated Learning (FL) has been gaining increasing interest to solve the problems related to privacy and communication overhead. FL is a ML approach in which different clients (e.g., edge servers) collaboratively train a ML model under the orchestration of a central FL server (e.g., central cloud) while keeping their respective data private. More precisely, a federated optimization system assumes a fixed set of K clients, each with a local dataset. At the beginning of each round of FL, a FL server selects a subset C of clients and sends them the current global ML model parameters. Each client in C performs local computation (i.e., model training) based on the global ML model and its local dataset. The clients in C then sends the model updates to the FL server. The FL server applies the global updates gathered from all the clients in C to its global state. This can be performed through different model update aggregation methods such as Federated Averaging (FedAvg). FedAvg consists of averaging the clients' local updates and sharing their average in the next round of FL. The process repeats for a few iterations (i.e., based on available time and computation budget) or until the FL model converges (i.e., there is no considerable improvement in the loss function by further running the FL process).

FL can be applied to train an anomaly detection model to detect anomalies at the edge of the network by leveraging the knowledge gained at each edge that is shared as model updates instead of data. FL can provide comparable performance to a cloud-centralized approach while preserving privacy and overcoming communication overhead.

As discussed above, anomaly detection has been widely studied in the literature and varied between centralized and distributed solutions. Most of the existing solutions adopt a ML approach for intrusion detection either using supervised learning considering labelled data, semi-supervised learning assuming partially labelled data or unsupervised learning accounting for unlabeled data. In one existing approach, a centralized ensemble Autoencoder is used for intrusion detection using statistical temporal features for different time-windows. Another approach proposes an anomaly detection solution using Autoencoder trained on time-based features. Another solution developed a distributed cyber-attacks detection solution in a fog environment using a Long Short-Term Memory model to identify threats targeting IoT devices.

FL has been applied for anomaly detection as described above. For example, one existing approach uses FL to detect compromised IoT devices based on their types. Another existing approach implemented a FL approach to detect anomalies in patients' medical devices connected to their mobile phones. Patients are classified based on their medical history, and an anomaly detection model trained based on a federated approach is designed for each group. Another existing approach trained a neural network in a federated manner to detect intrusions in IoT devices and compared their solution to a centralized approach.

Existing centralized solutions account for anomaly detection in a defined network element, while the FL intrusion detection solutions consider anomaly detection in IoT devices. While some existing approaches collect IoT data at edge nodes (i.e., gateway, fog nodes) which were used as FL clients, these solutions do not address the problem of anomaly detection at edge servers. Further, most of these unsupervised solutions train a ML model on data which is assumed to be benign in its majority and disregard the advantages that can be achieved by training the model on attack data as well.

Further, whether being centralized or federated, all ML-based intrusion detection approaches are either supervised, unsupervised or semi-supervised. In fact, intrusion detection can be represented as a supervised binary classification problem which learns to classify normal versus anomalous behavior based on labelled samples. However, such supervised approach fails to generalize to new types of anomalies and zero-day attacks as the model is only trained on a predefined set of anomalies. Furthermore, obtaining such a labelled set of data is difficult which makes supervised methods impractical.

For these reasons, unsupervised approaches have been widely adopted as an ideal solution for anomaly detection. In such techniques, an anomaly detection model is trained using a set of unlabeled data aiming to capture the benign behavior of the input. Although these approaches are referred to as unsupervised, it is usually assumed that the training data mostly consists of the benign samples and that there is typically a low occurrence of anomalies. Although anomaly-based solutions are less vulnerable to zero-day attack (since their training is not limited to the labelled anomalies of the training dataset), they may suffer from high false positive rate as they lack knowledge of true anomalies.

Hence, in order to reduce the false positive rate of unsupervised learning techniques without falling into a fully supervised approach hindering the generalization of the solution to unknown anomalies, semi-supervised technique leveraging a few anomalous labelled data has been used. The common anomaly-based approaches (e.g., neural networks) learn the distribution of the normal data. Then, the trained model is used to assign anomaly scores to test inputs such that it assigns high score to Out-Of-Distribution (OOD) samples (i.e., the samples that deviate from the distribution of data which was used to train the model). To enhance the detection accuracy, the model may be trained on few OOD inputs as well to better detect and expose them. This technique is referred to as Outlier Exposure (OE). OE has been shown to improve the detection of anomalies in image based classification. However, the OE approach was configured in a centralized setting and was specifically applied for image classification and not for network traffic anomaly detection.

SUMMARY

Some embodiments advantageously provide methods, systems, and apparatuses for an anomaly detection model based at least on Outlier Exposure (OE) capability for anomaly detection.

Providing computing capabilities at the edge of the network to assist IoT devices in processing their tasks is gaining increasing interest. Network operators are investing in providing such capabilities through distributing edge servers across their network. However, edge servers are exposed to different attacks that originate from vulnerable IoT devices, virtualization technologies and even deficiencies in the underlying infrastructure. Further, edge servers are distributed across different geographical locations and hold various data which is deemed private to their wireless devices/users who are served by the edge hosted at the specified location. An attack on an edge server may not only disrupt the services provided by that edge but can also escalate and hinders the security of other edges and the central cloud as well. Further, an edge server can experience attacks that were not encountered by another edge.

Hence, there is a need for a distributed anomaly detection solution that fulfills the following requirements:

Can leverage the knowledge gained from anomalies at different edges.

Preserves users' privacy.

Can cope with the sheer and variable amount of data across the edges.

Leverages collaboration between the edges for an increased detection accuracy.

In one or more embodiments described herein, an anomaly detection solution is provided that satisfies the above requirements. The anomaly detection solution provides edge severs with a defense mechanism against different types of attacks and anomalies. The one or more embodiments leverage FL to train a ML model, e.g., an Autoencoder, augmented with OE capability. The application of FL to the anomaly detection solution enables different edges, acting as FL clients, to collaborate under the orchestration of a central node (i.e., FL server) in order to better classify network traffic samples. The one or more embodiments combine the advantages of FL and deep neural networks, e.g., Autoencoders, in learning complex, non-linear relationships in input data along with OE technique to better expose anomalies. The anomaly detection described herein provides better and comparable detection performance to other existing centralized anomaly detection solutions but does so with a reduced network overhead.

According to one aspect of the present disclosure, a central node that is configured to communicate with a plurality of distributed nodes is provided. The central node includes processing circuitry configured to: train an Outlier Exposure (OE)-based autoencoder using unlabeled network data and labeled network attack data where the OE-based autoencoder is trained to reconstruct input data with an objective that is configured to minimize a reconstruction error on unlabeled network data and to maximize the reconstruction error on labeled network attack data, use the trained OE-based autoencoder to determine a reconstruction error on network traffic, and compare the determined reconstruction error to a threshold to determine if local network traffic is an anomaly.

According to one or more embodiments of this aspect, the anomaly detection corresponds to distributed denial-of-service, DDoS, detection. According to one or more embodiments of this aspect, an amount of the labeled network attack data used to train the Outlier Exposure-based autoencoder is less than an amount of the unlabeled network data used to train the Outlier Exposure-based autoencoder where the unlabeled network data and labeled network attack data is historical data. According to one or more embodiments of this aspect, the unlabeled network data is unlabeled benign network data, and the labeled network attack data is limited labeled attack data.

According to one or more embodiments of this aspect, the processing circuitry is further configured to: cause transmission of training information to a plurality of distributed nodes for training a local OE-based autoencoder at each distributed node using local network data where the local OE-based autoencoder is trained to reconstruct input data with an objective function that is configured to minimize a reconstruction error on network data of the local network data, receive a plurality Outlier Exposure-based autoencoder updates from the plurality of distributed nodes where the plurality of OE-based autoencoder updates are based on the training of the local OE-based autoencoder at each distributed node, aggregate the plurality of Outlier Exposure-based autoencoder updates to generate an aggregated Outlier Exposure-based autoencoder update, and cause transmission of the aggregated Outlier Exposure-based autoencoder update to the plurality of distributed nodes for updating the local OE-based autoencoder at each of the plurality of distributed nodes for anomaly detection.

According to one or more embodiments of this aspect, the local OE-based autoencoder is trained to reconstruct input data with the objective function that is configured to maximize the reconstruction error on network attack data of the local network data. According to one or more embodiments of this aspect, the local network data corresponds to an amount of the network attack data that is less than an amount of the network data. According to one or more embodiments of this aspect, the training information includes an Outlier-Exposure-based autoencoder structure, initial Outlier Exposure-based autoencoder weights and hyper parameters.

According to one or more embodiments of this aspect, the OE-based autoencoder is configured to reconstruct the input data in accordance with minimizing a loss function:

$$\text{loss}(W, D) = \frac{1}{|D|}\sum_{x_i, y_i \in D} \Gamma(x_i, y_i)$$

where $$\Gamma(x_i, y_i) = -((1 - y_i)\log\rho(d(x_i)) + y_i\log(1 - \rho(d(x_i)))$$

where:

$\rho(x)=\exp(-x)$ or $\rho(x)=\exp(-\sqrt{(x+1)}-1))$ is a non-increasing function with a value between zero and one; $d(x_i)$ is the Mean Squared Error, MSE, between $x_i$ and its reconstructed version $$\varphi(x_i),\ d(x_i) = \|\varphi(x_i) - x_i\|_2^2$$

W represents Outlier Exposure-based autoencoder weights; and $D=\{(x_1, y_1), \ldots, (x_i, y_i)\}$ where $x_i$ is a vector of normalized features and $y_i \in \{0,1\}$ is a label.

According to one or more embodiments of this aspect, a first term in Γ(xi,yi) is configured to minimize the reconstruction error on the unlabeled network data. According to one or more embodiments of this aspect, a second term in Γ(xi,yi) is configured to maximize the reconstruction error on the labeled network attack data.

According to another aspect of the present disclosure, a central node that is configured to communicate with a plurality of distributed nodes is provided. The central node includes processing circuitry configured to: train an Outlier Exposure (OE)-based autoencoder using unlabeled network data and labeled network attack data where the OE-based autoencoder is trained to reconstruct input data with an objective that is configured to minimize a reconstruction error on unlabeled network data and to maximize the reconstruction error on labeled network attack data, cause transmission of training information to a plurality of distributed nodes for training a local Outlier Exposure-based autoencoder at each distributed node using local network data where the training information is based at least on the trained OE-based autoencoder, and receive one or more Outlier Exposure-based autoencoder updates from the plurality of distributed nodes where the one or more OE-based autoencoder updates are based on the training of the local OE-based autoencoder at each distributed node.

According to one or more embodiments of this aspect, the processing circuitry is further configured to: aggregate the plurality of Outlier Exposure-based autoencoder updates to generate an aggregated Outlier Exposure-based autoencoder update, and cause transmission of the aggregated Outlier Exposure-based autoencoder update to the plurality of distributed nodes for updating the local OE-based autoencoder at each of the plurality of distributed nodes for anomaly detection. According to one or more embodiments of this aspect, the local OE-based autoencoder is trained to reconstruct input data with an objective function that is configured to minimize a reconstruction error on network data of the local network data. According to one or more embodiments of this aspect, the local OE-based autoencoder is trained to reconstruct input data with the objective function that is configured to maximize the reconstruction error on network attack data of the local network data.

According to one or more embodiments of this aspect, the local network data corresponds to an amount of the network attack data that is less than an amount of the network data. According to one or more embodiments of this aspect, the training information includes an Outlier-Exposure-based autoencoder structure, initial Outlier Exposure-based autoencoder weights and hyper parameters. According to one or more embodiments of this aspect, the training of the local Outlier Exposure-based autoencoder is based at least in part on local network attack data associated with a respective distributed node. According to one or more embodiments of this aspect, the processing circuitry is further configured to: use the trained OE-based autoencoder to determine a reconstruction error on network traffic associated with the central node, and compare the determined reconstruction error to a threshold to determine if the network traffic associated with the central node is an anomaly.

According to one or more embodiments of this aspect, the OE-based autoencoder is configured to reconstruct the input data in accordance with minimizing a loss function:

$$\text{loss}(W, D) = \frac{1}{|D|} \sum_{x_i, y_i \in D} \Gamma(x_i, y_i)$$

where $$\Gamma(x_i, y_i) = -((1 - y_i)\log\rho(d(x_i)) + y_i\log(1 - \rho(d(x_i)))$$

where:

$\rho(x)=\exp(-x)$ or $\rho(x)=\exp(-\sqrt{(x+1)}-1))$ is a non-increasing function with a value between zero and one; $d(x_i)$ is the Mean Squared Error, MSE, between $x_i$ and its reconstructed version $$\varphi(x_i), d(x_i) = \|\varphi(x_i) - x_i\|_2^2$$

W represents Outlier Exposure-based autoencoder weights; and $D=\{(x_1, y_1), \ldots, (x_i, y_i)\}$ where $x_i$ is a vector of normalized features and $y_i \in \{0,1\}$ is a label.

According to one or more embodiments of this aspect, a first term in Γ(xi,yi) is configured to minimize the reconstruction error on unlabeled network data. According to one or more embodiments of this aspect, a second term in Γ(xi,yi) is configured to maximize the reconstruction error on labeled network attack data.

According to one or more embodiments of this aspect, an amount of the labeled network attack data used to train the Outlier Exposure-based autoencoder is less than an amount of the unlabeled network data used to train the Outlier Exposure-based autoencoder where the unlabeled network data and labeled network attack data are historical data.

According to one or more embodiments of this aspect, the unlabeled network data is unlabeled benign network data, and the labeled network attack data is limited labeled attack data. According to one or more embodiments of this aspect, the anomaly detection corresponds to performing distributed denial-of-service, DDoS, detection.

According to another aspect of the present disclosure, a first distributed node is provided. The first distributed node includes processing circuitry configured to receive training information from a central node, train a local Outlier Exposure (OE)-based autoencoder model using local unlabeled network data and the training information, the local OE-based autoencoder being trained to reconstruct input data with an objective that is configured to minimize a reconstruction error on local unlabeled network data of local network traffic, use the trained local OE-based autoencoder model to determine a reconstruction error on the local network traffic, and compare the determined reconstruction error to a threshold to determine if the local network traffic is an anomaly.

According to one or more embodiments of this aspect, the processing circuitry is further configured to cause transmission of a local OE-based autoencoder update that is based at least on the local OE-based autoencoder training. According to one or more embodiments of this aspect, the processing circuitry is further configured to receive an aggregated OE-based autoencoder update, the aggregated OE-based autoencoder update being based on a plurality of OE-based autoencoder updates from a plurality of distributed node including the first distributed node where the aggregated OE-based autoencoder update is for one of anomaly detection and additional local OE-based autoencoder training. According to one or more embodiments of this aspect, the aggregated OE-based autoencoder update includes aggregated weights of a plurality of local OE-based autoencoders associated with the plurality of distributed nodes.

According to one or more embodiments of this aspect, the training of the local OE-based autoencoder further uses local labeled network attack data. According to one or more embodiments of this aspect, the local OE-based autoencoder is trained to reconstruct input data with the objective function that is configured to maximize the reconstruction error on labeled network attack data of the local network traffic. According to one or more embodiments of this aspect, the local network data corresponds to an amount of labeled network attack data that is less than an amount of the unlabeled network data. According to one or more embodiments of this aspect, the training information includes an Outlier-Exposure-based autoencoder structure, initial Outlier Exposure-based autoencoder weights and hyper parameters.

According to one or more embodiments of this aspect, the local OE-based autoencoder is configured to reconstruct the input data in accordance with minimizing a loss function:

$$\text{loss}(W, D) = \frac{1}{|D|} \sum_{x_i, y_i \in D} \Gamma(x_i, y_i)$$

where $$\Gamma(x_i, y_i) = -((1 - y_i)\log\rho(d(x_i)) + y_i\log(1 - \rho(d(x_i)))$$

where:

$\rho(x)=\exp(-x)$ or $\rho(x)=\exp(-\sqrt{(x+1)}-1))$ is a non-increasing function with a value between zero and one; $d(x_i)$ is the Mean Squared Error, MSE, between $x_i$ and its reconstructed version $$\varphi(x_i),\ d(x_i) = \|\varphi(x_i) - x_i\|_2^2$$

W represents local Outlier Exposure-based autoencoder weights; and $D=\{(x_1, y_1), \ldots, (x_i, y_i)\}$ where $x_i$ is a vector of normalized features and $y_i \in \{0,1\}$ is a label.

According to one or more embodiments of this aspect, a first term in Γ(xi,yi) is configured to minimize the reconstruction error on the unlabeled network data. According to one or more embodiments of this aspect, a second term in Γ(xi,yi) is configured to maximize the reconstruction error on labeled network attack data.

According to another aspect of the present disclosure, a method implemented by a central node that is configured to communicate with a plurality of distributed nodes is provided. An Outlier Exposure (OE)-based autoencoder is trained using unlabeled network data and labeled network attack data where the OE-based autoencoder is trained to reconstruct input data with an objective that is configured to minimize a reconstruction error on unlabeled network data and to maximize the reconstruction error on labeled network attack data. The trained OE-based autoencoder is used to determine a reconstruction error on network traffic. The determined reconstruction error is compared to a threshold to determine if local network traffic is an anomaly.

According to one or more embodiments of this aspect, the anomaly detection corresponds to distributed denial-of-service, DDoS, detection. According to one or more embodiments of this aspect, an amount of the labeled network attack data used to train the Outlier Exposure-based autoencoder is less than an amount of the unlabeled network data used to train the Outlier Exposure-based autoencoder where the unlabeled network data and labeled network attack data are historical data. According to one or more embodiments of this aspect, the unlabeled network data is unlabeled benign network data, and the labeled network attack data is limited labeled attack data.

According to one or more embodiments of this aspect, transmission is caused of training information to a plurality of distributed nodes for training a local OE-based autoencoder at each distributed node using local network data where the local OE-based autoencoder is trained to reconstruct input data with an objective function that is configured to minimize a reconstruction error on network data of the local network data. A plurality Outlier Exposure-based autoencoder updates are received from the plurality of distributed nodes where the plurality of OE-based autoencoder updates are based on the training of the local OE-based autoencoder at each distributed node. The plurality of Outlier Exposure-based autoencoder updates are aggregated to generate an aggregated Outlier Exposure-based autoencoder update. Transmission is caused of the aggregated Outlier Exposure-based autoencoder update to the plurality of distributed nodes for updating the local OE-based autoencoder at each of the plurality of distributed nodes for anomaly detection.

According to one or more embodiments of this aspect, the local OE-based autoencoder is trained to reconstruct input data with the objective function that is configured to maximize the reconstruction error on network attack data of the local network data. According to one or more embodiments of this aspect, the local network data corresponds to an amount of the network attack data that is less than an amount of the network data. According to one or more embodiments of this aspect, the training information includes an Outlier-Exposure-based autoencoder structure, initial Outlier Exposure-based autoencoder weights and hyper parameters.

According to one or more embodiments of this aspect, the OE-based autoencoder is configured to reconstruct the input data in accordance with minimizing a loss function:

$$\mathrm{loss}(W, D) = \frac{1}{|D|}\sum_{x_i, y_i \in D} \Gamma(x_i, y_i) \text{ where}$$

$$\Gamma(x_i, y_i) = -((1-y_i)\log\rho(d(x_i)) + y_i\log(1-\rho(d(x_i))))$$

where:

$\rho(x)=\exp(-x)$ or $\rho(x)=\exp(-\sqrt{(x+1)}-1))$ is a non-increasing function with a value between zero and one; $d(x_i)$ is the Mean Squared Error, MSE, between $x_i$ and its reconstructed version $$\varphi(x_i),\ d(x_i) = \|\varphi(x_i) - x_i\|_2^2$$

W represents Outlier Exposure-based autoencoder weights; and $D=\{(x_1, y_1), \ldots, (x_i, y_i)\}$ where $x_i$ is a vector of normalized features and $y_i \in \{0,1\}$ is a label.

According to one or more embodiments of this aspect, a first term in Γ(xi,yi) is configured to minimize the reconstruction error on the unlabeled network data. According to one or more embodiments of this aspect, a second term in Γ(xi,yi) is configured to maximize the reconstruction error on the labeled network attack data.

According to another aspect of the present disclosure, a method implemented by a central node that is configured to communicate with a plurality of distributed nodes is provided. An Outlier Exposure (OE)-based autoencoder is trained using unlabeled network data and labeled network attack data where the OE-based autoencoder is trained to reconstruct input data with an objective that is configured to minimize a reconstruction error on unlabeled network data and to maximize the reconstruction error on labeled network attack data. Transmission is caused of training information to a plurality of distributed nodes for training a local Outlier Exposure-based autoencoder at each distributed node using local network data where the training information is based at least on the trained OE-based autoencoder. One or more Outlier Exposure-based autoencoder updates are received from the plurality of distributed nodes where the one or more OE-based autoencoder updates are based on the training of the local OE-based autoencoder at each distributed node.

According to one or more embodiments of this aspect, the plurality of Outlier Exposure-based autoencoder updates are aggregated to generate an aggregated Outlier Exposure-based autoencoder update, and transmission is caused of the aggregated Outlier Exposure-based autoencoder update to the plurality of distributed nodes for updating the local OE-based autoencoder at each of the plurality of distributed nodes for anomaly detection. According to one or more embodiments of this aspect, the local OE-based autoencoder is trained to reconstruct input data with an objective function that is configured to minimize a reconstruction error on network data of the local network data. According to one or more embodiments of this aspect, the local OE-based autoencoder is trained to reconstruct input data with the objective function that is configured to maximize the reconstruction error on network attack data of the local network data.

According to one or more embodiments of this aspect, the local network data corresponds to an amount of the network attack data that is less than an amount of the network data. According to one or more embodiments of this aspect, the training information includes an Outlier-Exposure-based autoencoder structure, initial Outlier Exposure-based autoencoder weights and hyper parameters. According to one or more embodiments of this aspect, the training of the local Outlier Exposure-based autoencoder is based at least in part on local network attack data associated with a respective distributed node. According to one or more embodiments of this aspect, the trained OE-based autoencoder is used to determine a reconstruction error on local network traffic associated with the central node, and the determined reconstruction error is compared to a threshold to determine if local network traffic is an anomaly.

According to one or more embodiments of this aspect, the OE-based autoencoder is configured to reconstruct the input data in accordance with minimizing a loss function:

$$\mathrm{loss}(W, D) = \frac{1}{|D|}\sum_{x_i, y_i \in D} \Gamma(x_i, y_i) \text{ where}$$

$$\Gamma(x_i, y_i) = -((1 - y_i)\log\rho(d(x_i)) + y_i\log(1 - \rho(d(x_i)))$$

where:

$\rho(x)=\exp(-x)$ or $\rho(x)=\exp(-\sqrt{(x+1)}-1))$ is a non-increasing function with a value between zero and one; $d(x_i)$ is the Mean Squared Error, MSE, between $x_i$ and its reconstructed version $$\varphi(x_i),\ d(x_i) = \|\varphi(x_i) - x_i\|_2^2$$

W represents Outlier Exposure-based autoencoder weights; and $D=\{(x_1, y_1), \ldots, (x_i, y_i)\}$ where $x_i$ is a vector of normalized features and $y_i \in \{0,1\}$ is a label.

According to one or more embodiments of this aspect, a first term in Γ(xi,yi) is configured to minimize the reconstruction error on unlabeled network data. According to one or more embodiments of this aspect, a second term in Γ(xi,yi) is configured to maximize the reconstruction error on labeled network attack data. According to one or more embodiments of this aspect, an amount of the labeled network attack data used to train the Outlier Exposure-based autoencoder is less than an amount of the unlabeled network data used to train the Outlier Exposure-based autoencoder where the unlabeled network data and labeled network attack data are historical data.

According to one or more embodiments of this aspect, the unlabeled network data is unlabeled benign network data, and the labeled network attack data is limited labeled attack data. According to one or more embodiments of this aspect, the anomaly detection corresponds to performing distributed denial-of-service, DDoS, detection.

According to another aspect of the present disclosure, a method implemented by a first distributed node is provided. Training information is received from a central node. A local Outlier Exposure (OE)-based autoencoder model is trained using local unlabeled network data and the training information where the local OE-based autoencoder is trained to reconstruct input data with an objective that is configured to minimize a reconstruction error on local unlabeled network data of local network traffic. The trained local OE-based autoencoder model is used to determine a reconstruction error on the local network traffic. The determined reconstruction error is compared to a threshold to determine if the local network traffic is an anomaly.

According to one or more embodiments of this aspect, transmission is caused of a local OE-based autoencoder update that is based at least on the local OE-based autoencoder training. According to one or more embodiments of this aspect, an aggregated OE-based autoencoder update is received where the aggregated OE-based autoencoder update is based on a plurality of OE-based autoencoder updates from a plurality of distributed node including the first distributed node where the aggregated OE-based autoencoder update is for one of anomaly detection and additional local OE-based autoencoder training. According to one or more embodiments of this aspect, the aggregated OE-based autoencoder update includes aggregated weights of a plurality of local OE-based autoencoders associated with the plurality of distributed nodes.

According to one or more embodiments of this aspect, the training of the local OE-based autoencoder further uses local labeled network attack data. According to one or more embodiments of this aspect, the local OE-based autoencoder is trained to reconstruct input data with the objective function that is configured to maximize the reconstruction error on labeled network attack data of the local network traffic. According to one or more embodiments of this aspect, the local network data corresponds to an amount of labeled network attack data that is less than an amount of the unlabeled network data. According to one or more embodiments of this aspect, the training information includes an Outlier-Exposure-based autoencoder structure, initial Outlier Exposure-based autoencoder weights and hyper parameters.

According to one or more embodiments of this aspect, the local OE-based autoencoder is configured to reconstruct the input data in accordance with minimizing a loss function:

$$\mathrm{loss}(W, D) = \frac{1}{|D|}\sum_{x_i, y_i \in D} \Gamma(x_i, y_i) \text{ where}$$

$$\Gamma(x_i, y_i) = -((1 - y_i)\log\rho(d(x_i)) + y_i\log(1 - \rho(d(x_i)))$$

where:

$\rho(x)=\exp(-x)$ or $\rho(x)=\exp(-\sqrt{(x+1)}-1))$ is a non-increasing function with a value between zero and one; $d(x_i)$ is the Mean Squared Error, MSE, between $x_i$ and its reconstructed version $$\varphi(x_i),\ d(x_i) = \|\varphi(x_i) - x_i\|_2^2$$

W represents local Outlier Exposure-based autoencoder weights; and $D=\{(x_1, y_1), \ldots, (x_i, y_i)\}$ where $x_i$ is a vector of normalized features and $y_i \in \{0,1\}$ is a label.

According to one or more embodiments of this aspect, a first term in Γ(xi,yi) is configured to minimize the reconstruction error on the unlabeled network data. According to one or more embodiments of this aspect, a second term in Γ(xi,yi) is configured to maximize the reconstruction error on labeled network attack data.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
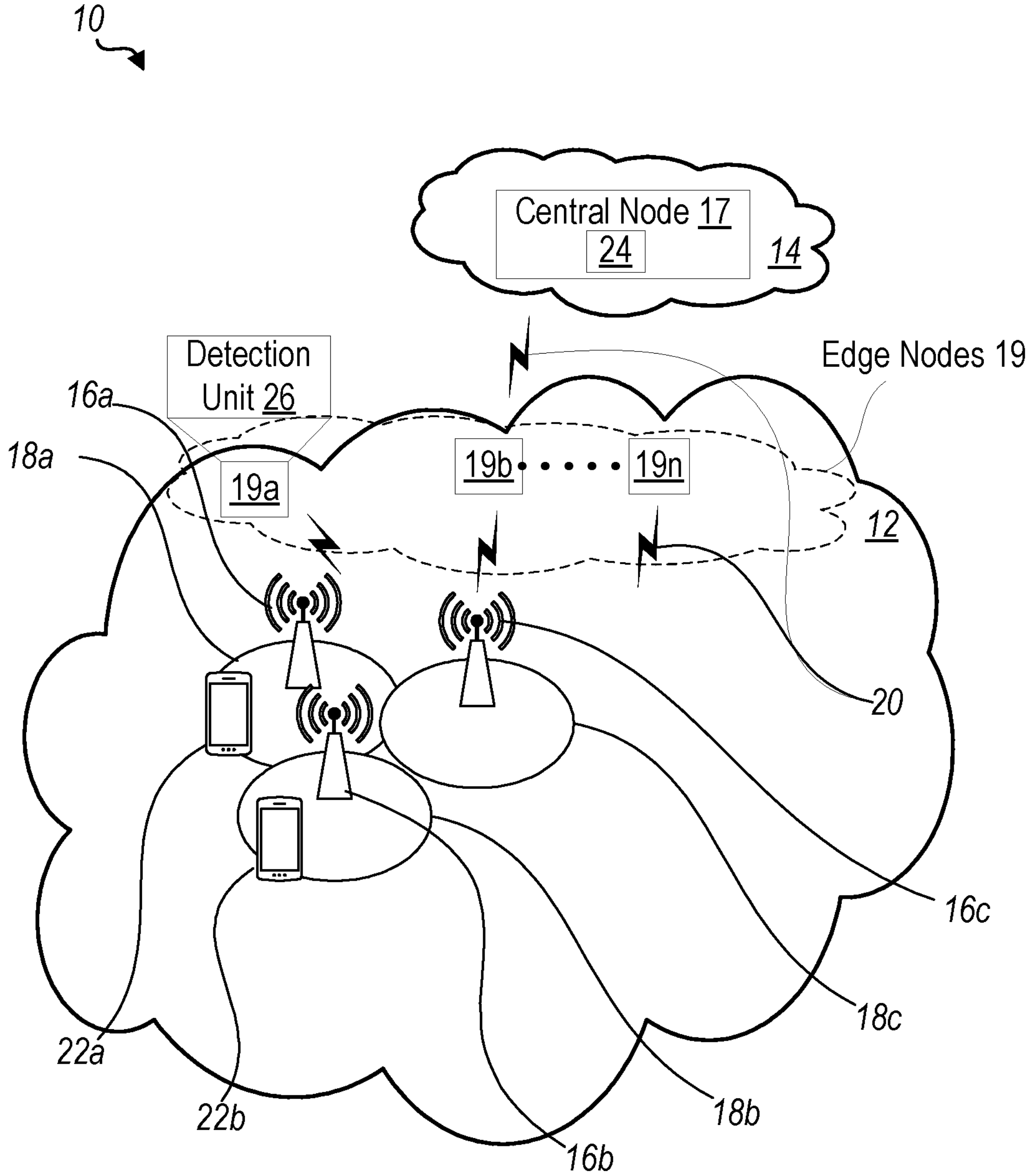
FIG. 1 is a schematic diagram of an example network architecture illustrating a communication system according to principles disclosed herein.

Before describing in detail exemplary embodiments, it is noted that the embodiments reside primarily in combinations of apparatus components and processing steps related to an Autoencoder modified with Outlier Exposure (OE) capability and that uses Federated learning (FL) for anomaly detection.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible for achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, edge/distributed nodes, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a user equipment (UE) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Transmitting in downlink may pertain to transmission from the network or network node to the wireless device. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to describe wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), WiFi, Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

In some embodiments, the general description elements in the form of "one of A and B" corresponds to A or B. In some embodiments, at least one of A and B corresponds to A, B or AB, or to one or more of A and B. In some embodiments, at least one of A, B and C corresponds to one or more of A, B and C, and/or A, B, C or a combination thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments are directed to an autoencoder modified with Outlier Exposure (OE) capability and that uses Federated learning (FL) for anomaly detection.

Referring to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Access network 12 includes one or more edge nodes 19*a*-19*n* (referred to collectively and/or interchangeably as one or more of edge node 19, edge server 17, distributed node 19 and FL client 19). In one or more embodiments, edge node 19 is at the access/edge of access network 12 and may be co-located with network node 16. Core network 14 includes one or more central nodes 17 (referred to collectively and/or interchangeably as one or more of central node 17, central server 17 and FL server 17).

Each network node 16*a*, 16*b*, 16*c* is connectable to the edge node 19 and/or core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A central node 17 is configured to include an aggregation unit 24 which is configured to perform one or more central node 17 functions as described herein such as with respect to an autoencoder modified with OE capability and that uses FL for anomaly detection. An edge node 19 is configured to include detection unit 26 which is configured to perform one or more edge node 19 functions described herein such as with respect to an autoencoder modified with OE capability and that uses FL for anomaly detection.

Note, while central node 17 and edge node 19 are illustrated as being separate from network node 16, in one or more embodiments, one or more central nodes 17 and/or edge nodes 19 are co-located with or part of one or more network node 16. Also, the techniques disclosed herein may also be beneficial for use in another type of network with a similar arrangement, such as a data network such as to provide one or more advantages described herein to other types of networks.

Example implementations, in accordance with one or more embodiments, network node 16, wireless device 22, central node 17 and edge node 19 discussed in the preceding paragraphs will now be described with reference to FIG. 2.

The communication system 10 includes a network node 16 provided in a communication system 10 and includes hardware 28 enabling it to communicate with the WD 22. The hardware 28 may include a communication interface 30 for setting up and maintaining at least a wireless connection 32 with a WD 22 located in a coverage area 18 served by the network node 16. The communication interface 30 may be formed as or may include, for example, one or more RF transmitters, one or more RF receivers, and/or one or more RF transceivers. The communication interface 30 includes an array of antennas 34 to radiate and receive signal(s) carrying electromagnetic waves.

In the embodiment shown, the hardware 28 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16.

The communication system 10 further includes the WD 22 already referred to. The WD 22 may have hardware 44 that may include a radio interface 46 configured to set up and maintain a wireless connection 32 with a network node 16 serving a coverage area 18 in which the WD 22 is currently located. The radio interface 46 may be formed as or may include, for example, one or more RF transmitters, one or more RF receivers, and/or one or more RF transceivers. The radio interface 46 includes an array of antennas 48 to radiate and receive signal(s) carrying electromagnetic waves.

The hardware 44 of the WD 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 56, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22.

The processing circuitry 50 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to WD 22.

The communication system 10 includes central node 17 provided in a communication system 10 and including hardware 60 enabling it to communicate with network node 16, edge node 19, etc. The hardware 60 may include a communication interface 62 for setting up and maintaining at least a connection 33 with one or more of network node 16, edge node 19, etc. The communication interface 62 may be formed as or may include, for example, one or more RF transmitters, one or more RF receivers, and/or one or more RF transceivers.

In the embodiment shown, the hardware 60 of the central node 17 further includes processing circuitry 64. The processing circuitry 64 may include a processor 66 and a memory 68. In particular, in addition to or instead of a processor, such as a central processing unit, and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) the memory 68, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the central node 17 further has software 70 stored internally in, for example, memory 68, or stored in external memory (e.g., database, storage array, network storage device, etc.) accessible by the central node 17 via an external connection. The software 70 may be executable by the processing circuitry 64. The processing circuitry 64 may be configured to control any of the methods and/or processes described herein and/or to cause such methods, and/or processes to be performed, e.g., by central node 17. Processor 66 corresponds to one or more processors 66 for performing central node 17 functions described herein. The memory 68 is configured to store data, programmatic software code and/or other information described herein. In some embodiments, the software 70 may include instructions that, when executed by the processor 66 and/or processing circuitry 64, causes the processor 66 and/or processing circuitry 64 to perform the processes described herein with respect to central node 17. For example, processing circuitry 64 of the central node 17 may include aggregation unit 24 that is configured to perform one or more central node 17 functions related to an anomaly detection model based at least on Outlier Exposure (OE) capability for anomaly detection, as described herein.

The communication system 10 further includes edge node 19 already referred to. The edge node 19 may have hardware 72 that may include communication interface 74 configured to set up and maintain a connection 20 with one or more of central node 17, network node 16, etc. The communication interface 74 may be formed as or may include, for example, one or more RF transmitters, one or more RF receivers, and/or one or more RF transceivers.

The hardware 72 of edge node 19 further includes processing circuitry 76. The processing circuitry 76 may include a processor 78 and memory 80. In particular, in addition to or instead of a processor, such as a central processing unit, and memory, the processing circuitry 76 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 78 may be configured to access (e.g., write to and/or read from) memory 80, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, edge node 19 may further comprise software 82, which is stored in, for example, memory 80 at the edge node 19, or stored in external memory (e.g., database, storage array, network storage device, etc.) accessible by the edge node 19. The software 82 may be executable by the processing circuitry 76.

The processing circuitry 76 may be configured to control any of the methods and/or processes described herein and/or to cause such methods, and/or processes to be performed, e.g., by edge node 19. The processor 78 corresponds to one or more processors 78 for performing edge node 19 functions described herein. The edge node 19 includes memory 80 that is configured to store data, programmatic software code and/or other information described herein. In some embodiments, the software 82 may include instructions that, when executed by the processor 78 and/or processing circuitry 76, causes the processor 78 and/or processing circuitry 76 to perform the processes described herein with respect to edge node 19. For example, the processing circuitry 76 of the edge node 19 may include detection unit 26 that is configured to perform one or more edge node 19 functions such as anomaly detection based at least on Outlier Exposure (OE) capability for anomaly detection, as described herein.

Figure 2:
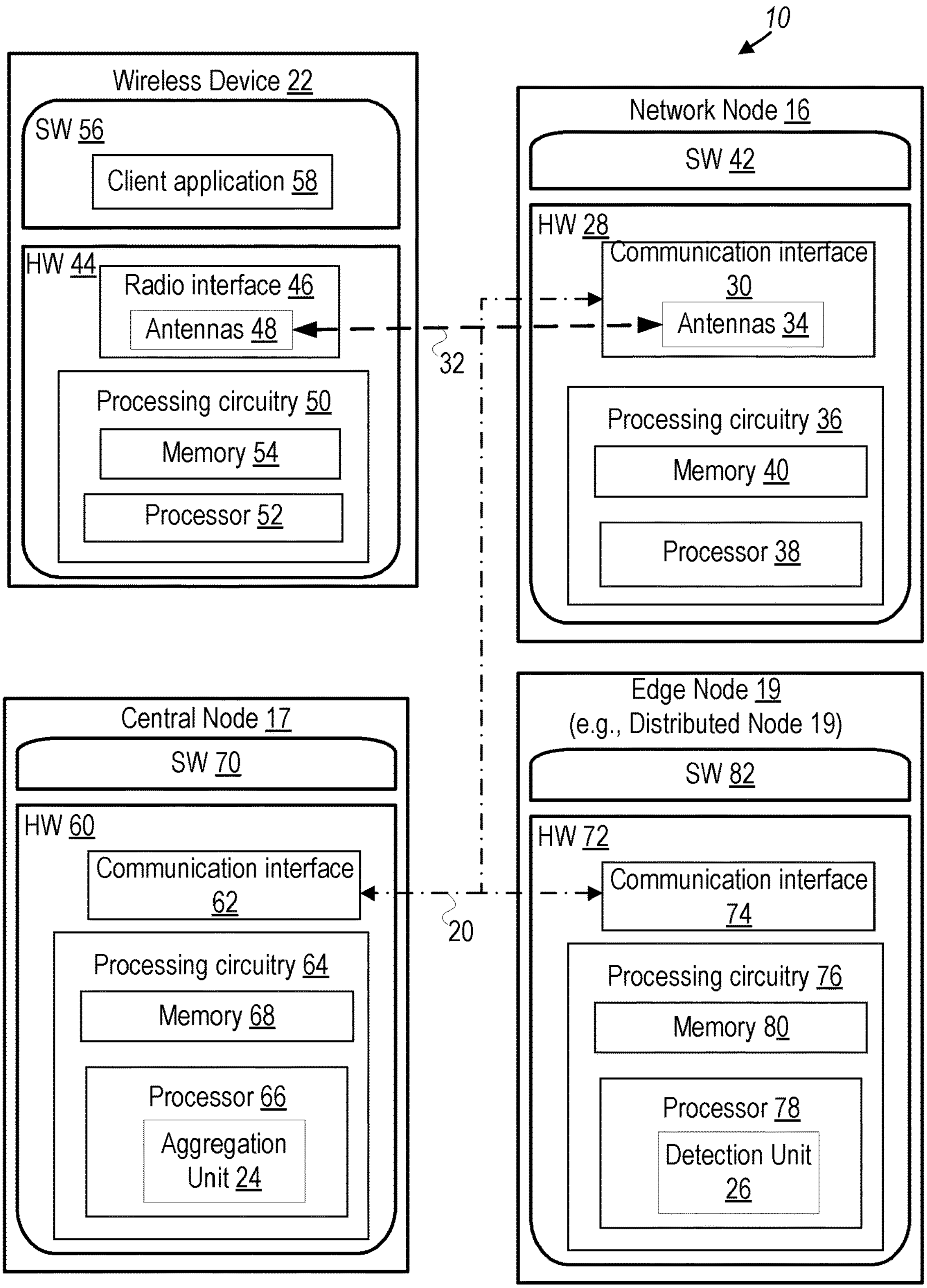
FIG. 2 is a block diagram of a portion of the communication system of FIG. 1 according to some embodiments of the present disclosure.

In some embodiments, the inner workings of the network node 16, WD 22, central node 17 and edge node 19 may be as shown in FIG. 2 and independently, the surrounding network topology may be that of FIG. 1.

The connection 20 between the central node 17 and edge node 19 is in accordance with the teachings of the embodiments described throughout this disclosure. In some embodiments, communications and/or signaling between central node 17 and edge node 19 described herein may be via the connection 20.

Although FIGS. 1 and 2 show various "units" such as aggregation unit 24 and detection unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
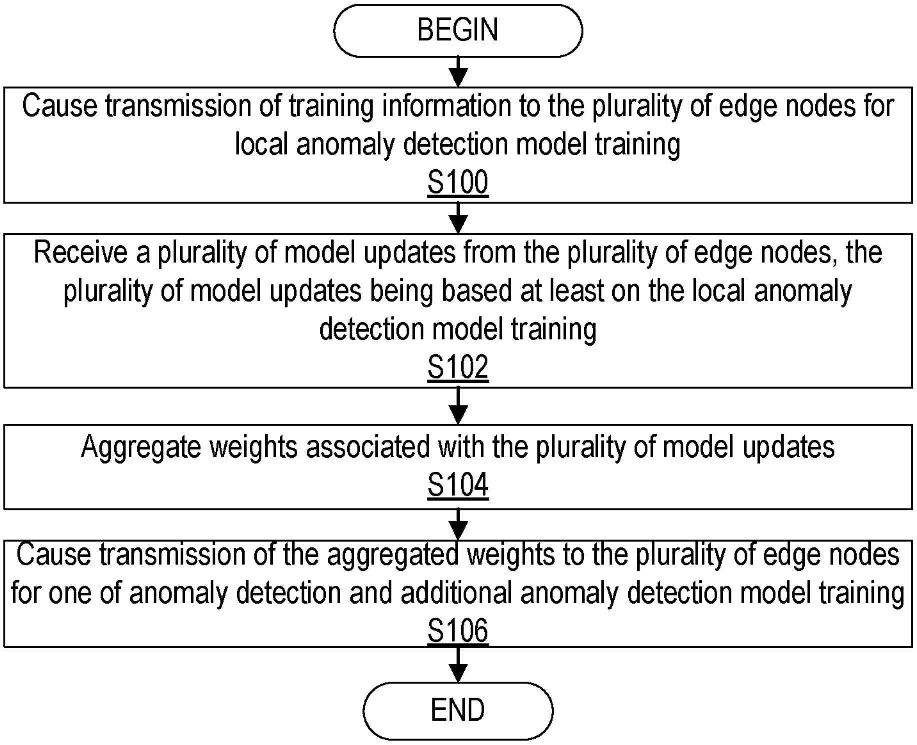
FIG. 3 is a flowchart of an example process in a central node according to some embodiments of the present disclosure.

FIG. 3 is a flowchart of an example process in a central node 17. One or more blocks described herein may be performed by one or more elements of central node 17 such as by one or more of processing circuitry 64 (including the aggregation unit 24), processor 66, and/or communication interface 62. Central node 17 is configured to cause (Block S100) transmission of training information to the plurality of edge nodes 19 for local anomaly detection model training, as described herein. Training information may generally refer to information usable by edge node 19 or by the local anomaly detection model to analyze training data (e.g., network traffic, training dataset). Training information may include at least one of ML model architecture, weight(s), hyperparameters, etc. In one example, the local anomaly detection model is an autoencoder.

Central node 17 is configured to receive (Block S102) a plurality of model updates from the plurality of edge nodes 19 where the plurality of model updates being based at least on the local anomaly detection model training, as described herein. Central node 17 is configured to aggregate (Block S104) weights associated with the plurality of model updates, as described herein. Central node 17 is configured to cause (Block S106) transmission of the aggregated weights to the plurality of edge nodes 19 for one of anomaly detection and additional anomaly detection model training, as described herein.

According to one or more embodiments, the aggregated weights are configured for use with an outliner exposure, OE, based model with federated learning. According to one or more embodiments, the aggregate weights are configured for use with an outlier exposure, OE, based model for network traffic anomaly detection. According to one or more embodiments, the aggregated weights are configured for use with an outlier exposure, OE, based autoencoder for OE based anomaly detection.

According to one or more embodiments, each of the plurality of model updates is based at least on benign network traffic used for local anomaly detection model training at a respective edge node. According to one or more embodiments, at least one of the plurality of model updates of at least one respective edge node 19 is based at least on limited labelled attack traffic used for local anomaly detection model training. In one or more embodiments, the use of OE as described herein is able to account for training the Autoencoder on network traffic collected during normal network operations (unlabeled traffic that may include both benign and attack data, but it is assumed benign in its majority) in addition to limited labelled attack traffic. Some edge nodes 19 may not be hosting labelled attack traffic so they may only use their available normal network traffic for the training.

Figure 4:
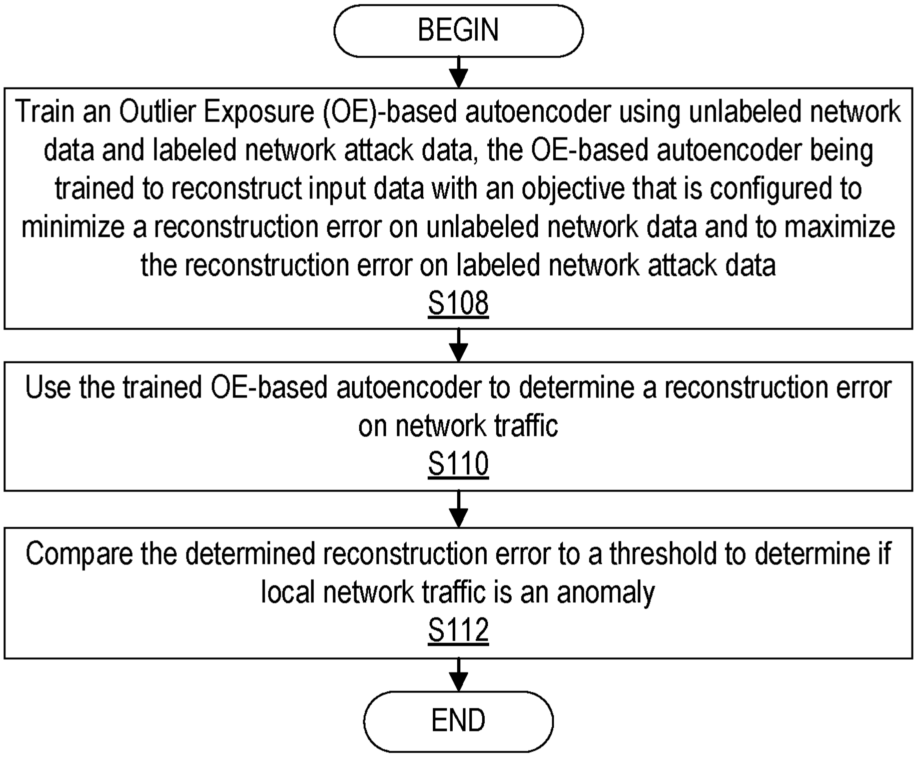
FIG. 4 is a flowchart of another example process in a central node according to some embodiments of the present disclosure.

FIG. 4 is a flowchart of another example process in a central node 17. One or more blocks described herein may be performed by one or more elements of central node 17 such as by one or more of processing circuitry 64 (including the aggregation unit 24), processor 66, and/or communication interface 62. Central node 17 is configured to train (Block S108) an Outlier Exposure (OE)-based autoencoder using unlabeled network data and labeled network attack data where the OE-based autoencoder is trained to reconstruct input data with an objective that is configured to minimize a reconstruction error on unlabeled network data and to maximize the reconstruction error on labeled network attack data. Central node 17 is configured to use (Block S110) the trained OE-based autoencoder to determine a reconstruction error on network traffic. Central node 17 is configured to compare (Block S112) the determined reconstruction error to a threshold to determine if local network traffic is an anomaly.

According to one or more embodiments, the anomaly detection corresponds to distributed denial-of-service, DDoS, detection. According to one or more embodiments, an amount of the labeled network attack data used to train the Outlier Exposure-based autoencoder is less than an amount of the unlabeled network data used to train the Outlier Exposure-based autoencoder where the unlabeled network data and labeled network attack data is historical data. According to one or more embodiments, the unlabeled network data is unlabeled benign network data where the labeled network attack data is limited labeled attack data.

According to one or more embodiments, the processing circuitry 64 is further configured to: cause transmission of training information to a plurality of distributed nodes 19 for training a local OE-based autoencoder at each distributed node 19 uses local network data where the local OE-based autoencoder is trained to reconstruct input data with an objective function that is configured to minimize a reconstruction error on network data of the local network data, and receive a plurality Outlier Exposure-based autoencoder updates from the plurality of distributed nodes 19 where the plurality of OE-based autoencoder updates are based on the training of the local OE-based autoencoder at each distributed node 19. The processing circuitry 64 is further configured to aggregate the plurality of Outlier Exposure-based autoencoder updates to generate an aggregated Outlier Exposure-based autoencoder update, and cause transmission of the aggregated Outlier Exposure-based autoencoder update to the plurality of distributed nodes for updating the local OE-based autoencoder at each of the plurality of distributed nodes for anomaly detection.

According to one or more embodiments, the local OE-based autoencoder is trained to reconstruct input data with the objective function that is configured to maximize the reconstruction error on network attack data of the local network data. According to one or more embodiments, the local network data corresponds to an amount of the network attack data that is less than an amount of the network data. According to one or more embodiments, the training information includes an Outlier-Exposure-based autoencoder structure, initial Outlier Exposure-based autoencoder weights and hyper parameters.

According to one or more embodiments, the OE-based autoencoder is configured to reconstruct the input data in accordance with minimizing a loss function:

$$\text{loss}(W, D) = \frac{1}{|D|} \sum_{x_i, y_i \in D} \Gamma(x_i, y_i) \text{ where}$$

$$\Gamma(x_i, y_i) = -((1 - y_i)\log\rho(d(x_i)) + y_i\log(1 - \rho(d(x_i)))$$

where:

$\rho(x)=\exp(-x)$ or $\rho(x)=\exp(-\sqrt{(x+1)}-1))$ is a non-increasing function with a value between zero and one; $d(x_i)$ is the Mean Squared Error, MSE, between $x_i$ and its reconstructed version $$\varphi(x_i),\ d(x_i) = \|\varphi(x_i) - x_i\|_2^2$$

W represents Outlier Exposure-based autoencoder weights; and $D=\{(x_1, y_1), \ldots, (x_i, y_i)\}$ where $x_i$ is a vector of normalized features and $y_i \in \{0,1\}$ is a label.

According to one or more embodiments, a first term in Γ(xi,yi) is configured to minimize the reconstruction error on the unlabeled network data. According to one or more embodiments, a second term in Γ(xi,yi) is configured to maximize the reconstruction error on the labeled network attack data.

Figure 5:
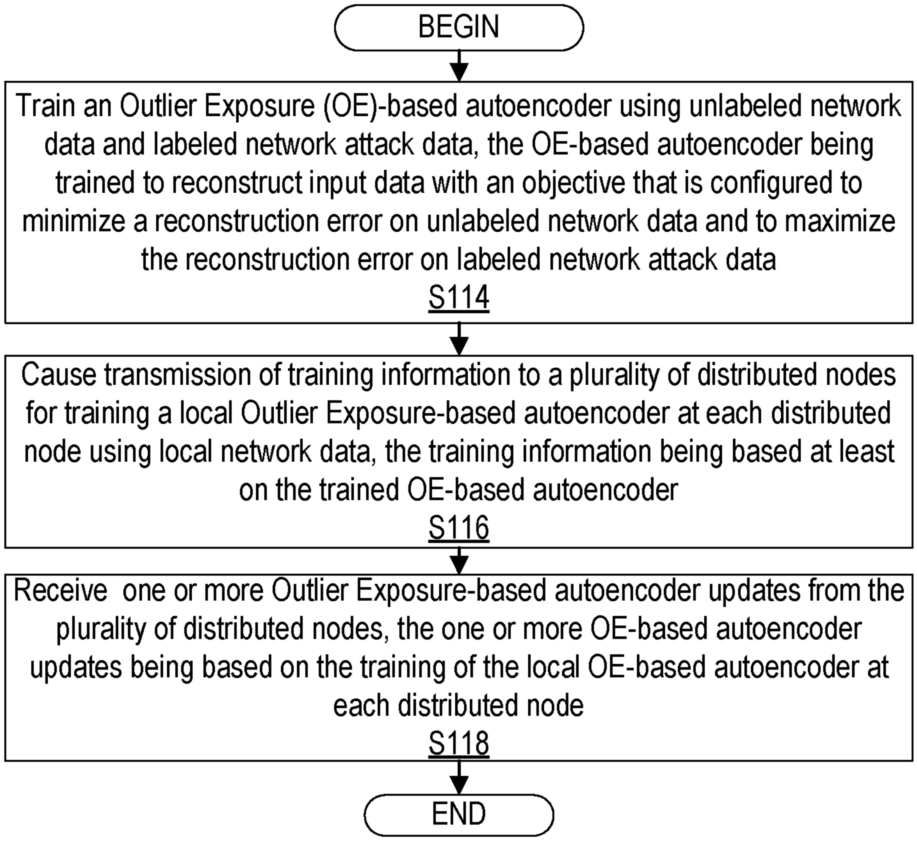
FIG. 5 is a flowchart of another example process in a central node according to some embodiments of the present disclosure.

FIG. 5 is a flowchart of another example process in a central node 17. One or more blocks described herein may be performed by one or more elements of central node 17 such as by one or more of processing circuitry 64 (including the aggregation unit 24), processor 66, and/or communication interface 62. Central node 17 is configured to train (Block S114) train an Outlier Exposure (OE)-based autoencoder using unlabeled network data and labeled network attack data where the OE-based autoencoder is trained to reconstruct input data with an objective that is configured to minimize a reconstruction error on unlabeled network data and to maximize the reconstruction error on labeled network attack data. Central node 17 is configured to cause (Block S116) transmission of training information to a plurality of distributed nodes 19 for training a local Outlier Exposure-based autoencoder at each distributed node 19 using local network data where the training information is based at least on the trained OE-based autoencoder. Central node 17 is configured to receive (Block S118) one or more Outlier Exposure-based autoencoder updates from the plurality of distributed nodes 19 where the one or more OE-based autoencoder updates is based on the training of the local OE-based autoencoder at each distributed node 19.

According to one or more embodiments, the processing circuitry 64 is further configured to: aggregate the plurality of Outlier Exposure-based autoencoder updates to generate an aggregated Outlier Exposure-based autoencoder update, and cause transmission of the aggregated Outlier Exposure-based autoencoder update to the plurality of distributed nodes 19 for updating the local OE-based autoencoder at each of the plurality of distributed nodes 19 for anomaly detection. According to one or more embodiments, the local OE-based autoencoder is trained to reconstruct input data with an objective function that is configured to minimize a reconstruction error on network data of the local network data. According to one or more embodiments, the local OE-based autoencoder is trained to reconstruct input data with the objective function that is configured to maximize the reconstruction error on network attack data of the local network data.

According to one or more embodiments, the local network data corresponds to an amount of the network attack data that is less than an amount of the network data. According to one or more embodiments, the training information includes an Outlier-Exposure-based autoencoder structure, initial Outlier Exposure-based autoencoder weights and hyper parameters. According to one or more embodiments, the training of the local Outlier Exposure-based autoencoder is based at least in part on local network attack data associated with a respective distributed node 19.

According to one or more embodiments, the processing circuitry 64 is further configured to use the trained OE-based autoencoder to determine a reconstruction error on network traffic associated with the central node 17, and compare the determined reconstruction error to a threshold to determine if network traffic associated with the central node 17 is an anomaly. According to one or more embodiments, the OE-based autoencoder is configured to reconstruct the input data in accordance with minimizing a loss function:

$$\text{loss}(W, D) = \frac{1}{|D|}\sum_{x_i, y_i \in D} \Gamma(x_i, y_i) \text{ where}$$

$$\Gamma(x_i, y_i) = -((1 - y_i)\log\rho(d(x_i)) + y_i\log(1 - \rho(d(x_i)))$$

where:

$\rho(x)=\exp(-x)$ or $\rho(x)=\exp(-\sqrt{(x+1)}-1))$ is a non-increasing function with a value between zero and one; $d(x_i)$ is the Mean Squared Error, MSE, between $x_i$ and its reconstructed version $$\varphi(x_i),\ d(x_i) = \|\varphi(x_i) - x_i\|_2^2$$

W represents Outlier Exposure-based autoencoder weights; and $D=\{(x_1, y_1), \ldots, (x_i, y_i)\}$ where $x_i$ is a vector of normalized features and $y_i \in \{0,1\}$ is a label.

According to one or more embodiments, a first term in Γ(xi,yi) is configured to minimize the reconstruction error on unlabeled network data. According to one or more embodiments, a second term in Γ(xi,yi) is configured to maximize the reconstruction error on labeled network attack data. According to one or more embodiments, an amount of the labeled network attack data used to train the Outlier Exposure-based autoencoder is less than an amount of the unlabeled network data used to train the Outlier Exposure-based autoencoder where the unlabeled network data and labeled network attack data is historical data.

According to one or more embodiments, the unlabeled network data is unlabeled benign network data, and the labeled network attack data is limited labeled attack data. According to one or more embodiments, the anomaly detection corresponds to performing distributed denial-of-service, DDoS, detection.

Figure 6:
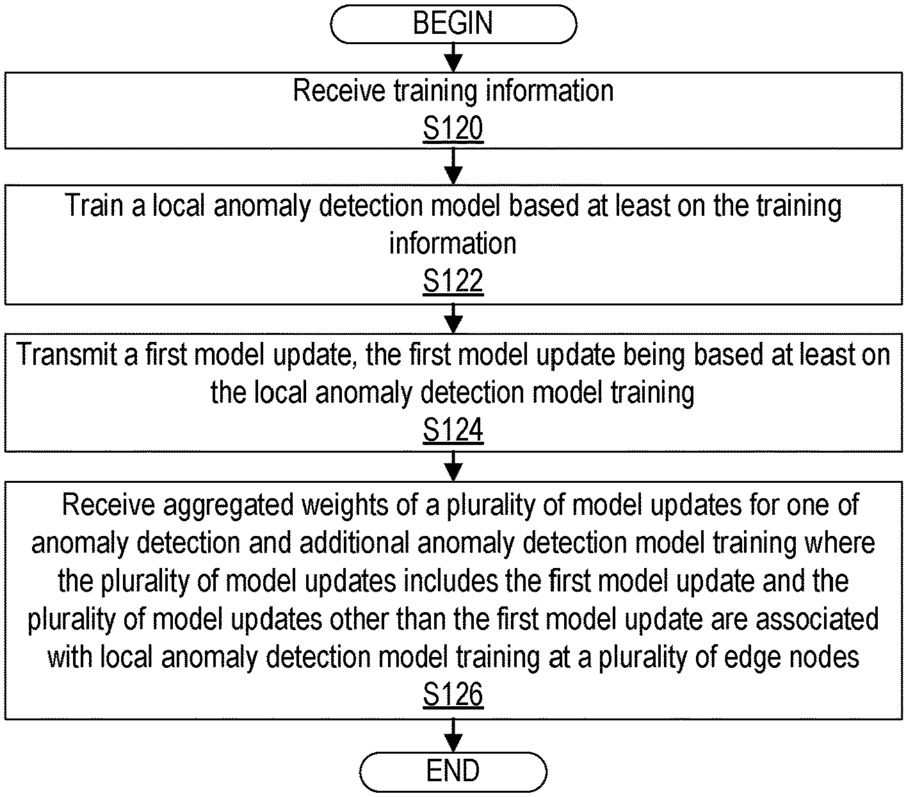
FIG. 6 is a flowchart of an example process in an edge/distributed node according to some embodiments of the present disclosure.

FIG. 6 is a flowchart of an example process in an edge node 19 (i.e., a first edge node 19) according to some embodiments of the present disclosure. One or more blocks described herein may be performed by one or more elements of edge node 19 such as by one or more of processing circuitry 76 (including the detection unit 26), processor 78, and/or communication interface 74. Edge node 19 is configured to receive (Block S120) training information, as described herein. Edge node 19 is configured to train (Block S122) a local anomaly detection model based at least on the training information, as described herein. Edge node 19 is configured to transmit (Block S124) a first model update, the first model update being based at least on the local anomaly detection model training, as described herein. Edge node 19 is configured to receive (Block S126) aggregated weights of a plurality of model updates for one of anomaly detection and additional anomaly detection model training where the plurality of model updates include the first model update and the plurality of model updates other than the first model update are associated with local anomaly detection model training at a plurality of edge nodes 19, as described herein.

According to one or more embodiments, the first model update is based on an outliner exposure, OE, based model with federated learning, as described herein. According to one or more embodiments, the aggregate weights are configured for use with an outlier exposure, OE, based model for network traffic anomaly detection, as described herein.

According to one or more embodiments, the aggregate weights are configured for use with an outlier exposure, OE, based autoencoder for OE based anomaly detection, as described herein. For example, the OE is introduced to the Autoencoder by: training the autoencoder with limited labeled attack traffic along with normal network traffic and using an OE objective function. In each round of FL, each edge node 19 will train the autoencoder using the OE objective function and where the edge node 19 sends the model updates to central node 17. According to one or more embodiments, each of the plurality of model updates is based at least on benign network traffic used for local anomaly detection model training at a respective edge node, as described herein. According to one or more embodiments, the first model update is based at least on limited labelled attack traffic used for local anomaly detection model training, as described herein.

Figure 7:
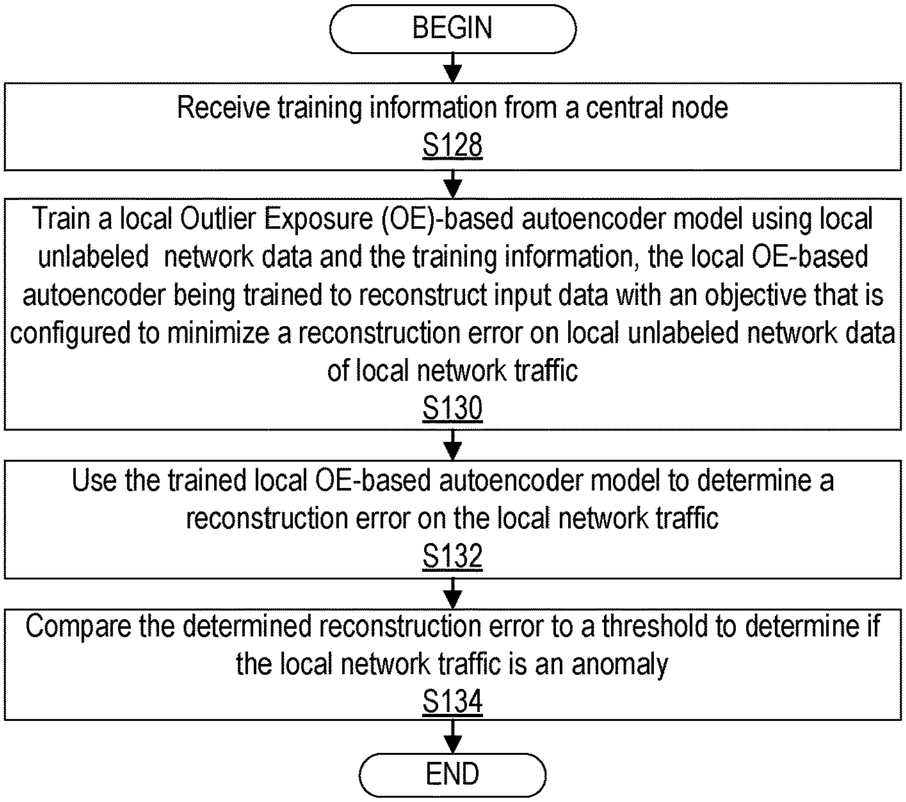
FIG. 7 is a flowchart of an example process in an edge/distributed node according to some embodiments of the present disclosure.

FIG. 7 is a flowchart of another example process in an distributed node 19 (i.e., a first distributed node 19) according to some embodiments of the present disclosure. One or more blocks described herein may be performed by one or more elements of distributed node 19 such as by one or more of processing circuitry 76 (including the detection unit 26), processor 78, and/or communication interface 74. Distributed node 19 is configured to receive (Block S128) receive training information from a central node. Distributed node 19 is configured to train (Block 130) a local Outlier Exposure (OE)-based autoencoder model using local unlabeled network data and the training information where the local OE-based autoencoder is trained to reconstruct input data with an objective that is configured to minimize a reconstruction error on local unlabeled network data of local network traffic. Distributed node 19 is configured to use (Block S132) the trained local OE-based autoencoder model to determine a reconstruction error on the local network traffic. Distributed node 19 is configured to compare (Block S134) the determined reconstruction error to a threshold to determine if the local network traffic is an anomaly.

According to one or more embodiments, the processing circuitry is further configured to cause transmission of a local OE-based autoencoder update that is based at least on the local OE-based autoencoder training. According to one or more embodiments, the processing circuitry 76 is further configured to receive an aggregated OE-based autoencoder update where the aggregated OE-based autoencoder update is based on a plurality of OE-based autoencoder updates from a plurality of distributed node 19 including the first distributed node 19 where the aggregated OE-based autoencoder update being for one of anomaly detection and additional local OE-based autoencoder training. According to one or more embodiments, the aggregated OE-based autoencoder update includes aggregated weights of a plurality of local OE-based autoencoders associated with the plurality of distributed nodes 19.

According to one or more embodiments, the training of the local OE-based autoencoder further uses local labeled network attack data. According to one or more embodiments, the local OE-based autoencoder is trained to reconstruct input data with the objective function that is configured to maximize the reconstruction error on labeled network attack data of the local network traffic. According to one or more embodiments, the local network data corresponds to an amount of labeled network attack data that is less than an amount of the unlabeled network data.

According to one or more embodiments, the training information includes an Outlier-Exposure-based autoencoder structure, initial Outlier Exposure-based autoencoder weights and hyper parameters. According to one or more embodiments, the local OE-based autoencoder is configured to reconstruct the input data in accordance with minimizing a loss function:

$$\text{loss}(W, D) = \frac{1}{|D|} \sum_{x_i, y_i \in D} \Gamma(x_i, y_i) \text{ where}$$

$$\Gamma(x_i, y_i) = -((1 - y_i)\log\rho(d(x_i)) + y_i\log(1 - \rho(d(x_i))))$$

where:

- $\rho(x)=\exp(-x)$ or $\rho(x)=\exp(-\sqrt{(x+1)}-1))$ is a non-increasing function with a value between zero and one; $d(x_i)$ is the Mean Squared Error, MSE, between $x_i$ and its reconstructed version $$\varphi(x_i),\ d(x_i) = \|\varphi(x_i) - x_i\|_2^2$$

- W represents local Outlier Exposure-based autoencoder weights; and
- $D=\{(x_1, y_1), \ldots, (x_i, y_i)\}$ where $x_i$ is a vector of normalized features and $y_i \in \{0,1\}$ is a label.

According to one or more embodiments, a first term in Γ(xi,yi) is configured to minimize the reconstruction error on the unlabeled network data. According to one or more embodiments, a second term in Γ(xi,yi) is configured to maximize the reconstruction error on labeled network attack data.

Having described the general process flow of arrangements of the disclosure and having provided examples of hardware and software arrangements for implementing the processes and functions of the disclosure, the sections below provide details and examples of arrangements for an autoencoder modified with OE capability and that is trained based on FL for anomaly detection.

Some embodiments provide an autoencoder modified with OE capability and that uses FL for anomaly detection. One or more edge node 19 (e.g., distributed node 19) functions described below may be performed by one or more of processing circuitry 76, processor 78, communication interface 74, detection unit 26, etc. One or more central node 17 functions described below may be performed by one or more of processing circuitry 64, processor 66, aggregation unit 24, communication interface 62, etc.

Context Overview

An example cloud-based environment is considered where this environment includes a network (i.e., telecommunication network, organization internal network, data center network, etc.) enabled with cloud computing capabilities deployed at the edge (i.e., edge servers also referred to as edge nodes 19). These edge nodes 19 can be subject to different data privacy regulations. Hence, it may not be possible to share their data with other nodes such as central node 17 in the network. Apart from the privacy concern, the amount of data collected at each edge node could be very large which results in high communication cost if this edge node 19 has to transmit its data to another node such as a central node 17. In addition, the data observed at different edge nodes 19 could be non-independent and/or non-identically distributed as it reflects the unique behavior of different edge node 19's users (i.e., wireless devices 22).

Nonetheless, edge nodes 19 experience different types of traffic and can also be subject to multiple attacks. One edge node 19 can experience an attack that the other did not encounter before but can experience such an attack in the future. Attack data can be identified and analyzed by security experts and can serve in building an anomaly detection solution.

One or more embodiments described herein leverage the knowledge gained by edge nodes 19 through their benign and attack data to build a distributed, collaborative, intelligent anomaly detection solution. FL is applied for knowledge sharing between edge nodes 19, reducing the communication cost, and preserving data privacy. The benefits gained from training a neural network in learning complex, non-linear relationships in input data is combined with the advantages from OE in increasing the model accuracy. More precisely, an Autoencoder is built with an OE objective trained in a federated manner.

Anomaly Detection Framework

Figure 8:
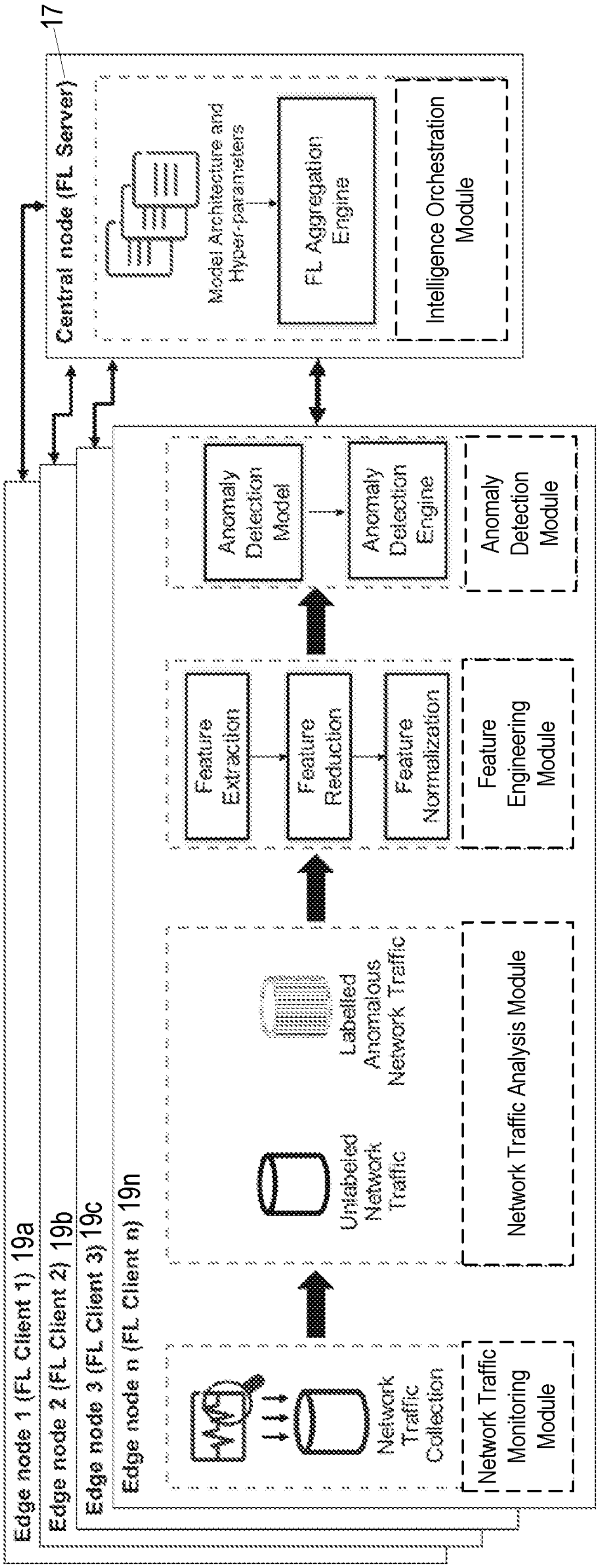
FIG. 8 is a diagram of anomaly detection framework according to some embodiments of the present disclosure.

One or more embodiments described herein provide a distributed anomaly detection framework that includes different modules distributed across multiple nodes such as on edge nodes 19*a*-19*n* augmented with anomaly detection capabilities and a central node 17 (i.e., central server) that can be hosted in a centralized cloud, as illustrated in FIG. 8. Each edge node 19 represents an FL client. Hence, as used herein, edge node 19 and FL client may be used interchangeably, and central node 17 may be referred to as an FL server.

Each edge node 19 may host one or more of the following modules in, for example, detection unit 26, that provide the anomaly detection framework:

- Network traffic monitoring module: The network traffic monitoring module monitors and collects network traffic to be further analyzed and used for enabling intelligent security controls, mainly anomaly detection. The collected traffic reflects normal network operation; however, the collected traffic can also include some attack traffic based on the network state.
- Network traffic analysis module: A responsibility of this module is to prepare the training dataset (also referred to as training data) used by the model to learn the statistics of the "normal" operation of the network (i.e., statistics of the benign network traffic). Although this training dataset does not need to be labelled, it should mostly contain benign network traffic.

Additionally, the network traffic analysis module may benefit from the presence of security experts to analyze and label a subset of the collected network traffic provided by the network monitoring module in order to label anomalies and attacks, if any. The size of the labelled anomalous data could be very limited in comparison to the training dataset. This is because data labelling may be a daunting task that may require highly skilled security professionals. Further, the network is occasionally under attack which leads to more availability of benign traffic. Note that the labelled network traffic might not be present at all the edge nodes 19. To depict this, the labelled anomalous network traffic is illustrated as a shaded block in FIG. 8.

Feature engineering module: The feature engineering module is an intrinsic element of the anomaly detection framework as it is responsible for the data pre-processing to suit the anomaly detection learning model. The data pre-processing operates the same for the unlabeled network traffic and the labelled one (if available) provided by the network traffic analysis module. The feature engineering module includes a feature extraction component, a feature reduction component and a feature normalization component, which are described below.

Feature extraction component: Feature extraction component is dedicated for generating features from the collected network traffic. Such features can be packet-based features (e.g., inter-packet delay, etc.) or flow-based features (i.e., flow duration, flag count, etc.) which may or may not be reflecting statistical (e.g., min, max, sum of packets per flow, etc.) or temporal (e.g., packets per second, etc.) information. These features represent traffic information that can be useful for anomaly detection.

Feature reduction component: The feature reduction component performs a fine-grained feature engineering. It reduces the number of features extracted by the feature extraction component and retains those that better reflect the network behavior. It further removes any multicollinearity that might affect the model performance.

Feature normalization component: In case the features retained by the feature reduction component have scales that differ by a predefined amount, the feature normalization component rescales the features to lie in the same predefined range. This will allow the ML model to give equal consideration to all the features.

Anomaly detection module: The anomaly detection module is responsible for profiling the network traffic, the detection of anomalies and the interaction with the central node 17. The Anomaly detection module includes an anomaly detection model and an anomaly detection engine, which are described below.

The anomaly detection model: The anomaly detection model (e.g., software 82) that may be stored in memory 80 is application dependent. For application provided herein is a neural network model (more precisely an Autoencoder) whose architecture and hyper-parameters are communicated by the central node 17. This model is trained and updated using a known FL process described above. The applied Autoencoder in one or more embodiments described herein is different from commonly used Autoencoders for anomaly detection as it considers outlier samples and accounts for a modified loss function. The details of the model and the new loss function are described in the "OE-based Autoencoder for anomaly detection" section below.

The anomaly detection engine: The anomaly detection engine may be provided by processing circuitry 76 and performs the training of the anomaly detection model by using the network traffic samples provided by the feature engineering module. The anomaly detection engine further accounts for the model weights which are communicated by the FL aggregation engine of the intelligence orchestration module hosted by the central node 17. The anomaly detection engine performs the online anomaly detection as well using the trained anomaly detection model.

The central node 17 may host one or more of the following module that may be provided by aggregation unit 24 and/or processing circuitry:

Intelligence orchestration module: The intelligence orchestration is responsible for managing the federated learning process, and includes learning hyper-parameters and FL aggregation engine described below.

Learning hyper-parameters: As the edge nodes are acting as FL clients, the neural network architecture of the anomaly detection model, the learning rate and other dynamics of training, i.e., training information (e.g., hyper-parameters) may be first communicated to the anomaly detection module of the edge nodes.

FL aggregation engine: The FL aggregation engine is the block that aggregates and communicates the knowledge shared by all the edge nodes 19 to enable collaborative learning while maintaining edge node 19's data privacy. This is performed by collecting the model updates (i.e., weights of the neural network) from the anomaly detection engine of each edge node and aggregating them using an aggregation method, for example, FedAvg. The FL aggregation engine then sends the aggregated weights to the anomaly detection engine of the edge nodes 19.

OE-Based Autoencoder for Anomaly Detection

In one or more embodiments, edge nodes 19 are augmented with intelligent anomaly detection capability through deploying an anomaly detection model. Also, an Autoencoder with outlier exposure that trains the ML model with an auxiliary dataset of anomalies is built, i.e., a local autoencoder is built at edge node 19. This enables the Autoencoder to generalize and better detect unseen anomalies. The anomaly detection problem is described below and the details of the anomaly detection model are also described below.

A Problem Statement

Given a training dataset $D=\{D^u, D^a\}$ with $D^u \cap D^a\ \{\emptyset\}$, where $D^u$ is an unlabeled dataset of network traffic collected during normal network operation, and $D^a$ is a dataset encompassing labelled anomalous samples belonging to one or more of the anomalies that could happen in the network. $D^u$ is not a labelled dataset but it is assumed that at most a small portion of it is anomalous while the rest represents benign network traffic. An outlier exposure function $f:D \rightarrow \mathbb{R}$ is determined where the outlier exposure assigns an anomaly score to network traffic instances such that $f(d^n)<f(d^a)$, where $d^n, d^a \in \mathbb{R}^D$ are data points from D depicting benign and anomalous network traffic, respectively.

In this section it is assumed that only one dataset D will be used to train the Autoencoder. The FL case in which multiple datasets will be used to train the ML model follows a similar approach and is detailed in the "Autoencoder training using FL" section.

Autoencoder

Figure 9:
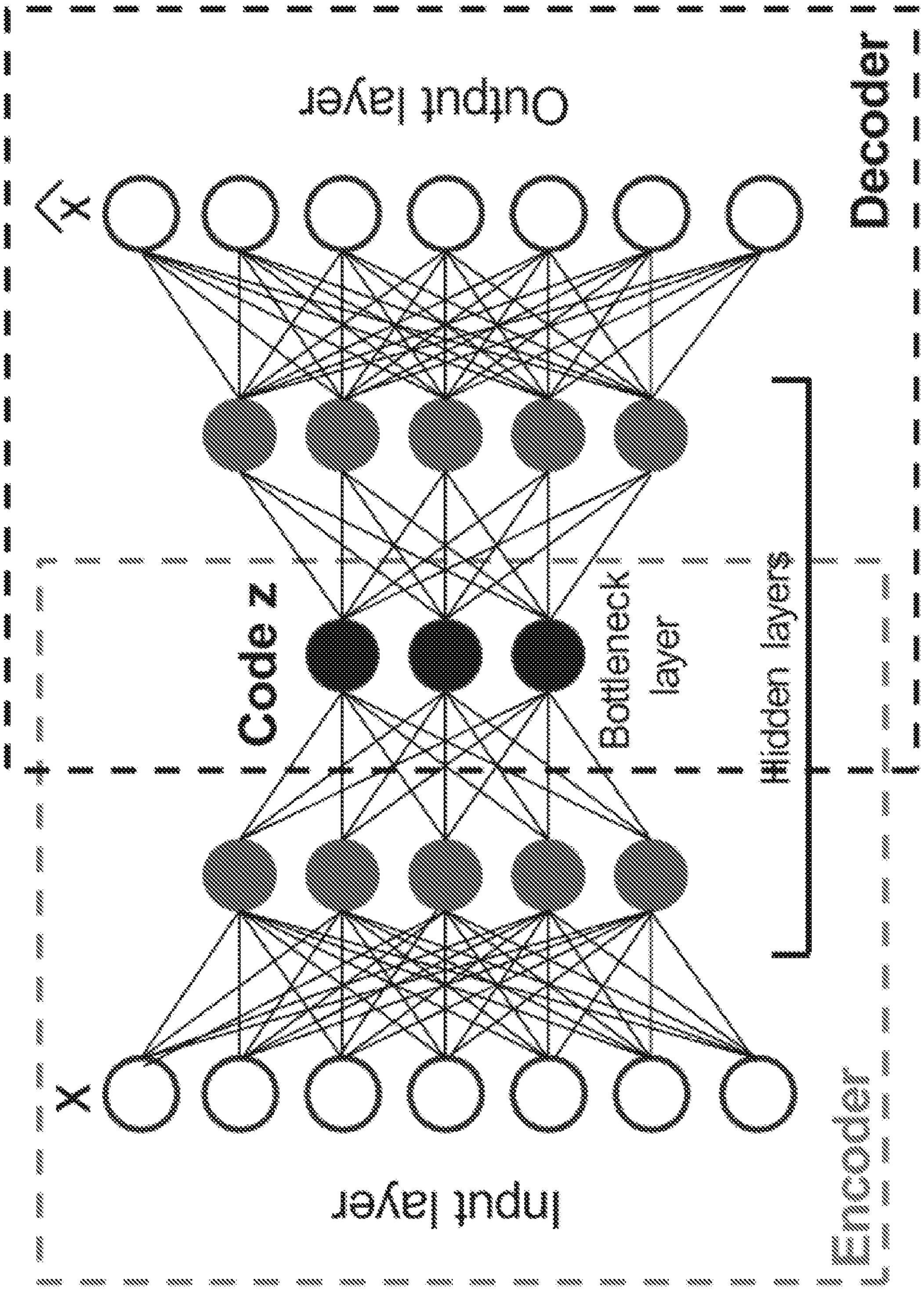
FIG. 9 is an example of an autoencoder according to some embodiments of the present disclosure.

In order to solve the aforementioned problem, a known multi-layer neural network is used, i.e., an Autoencoder. An Autoencoder is configured to adopt a symmetric structure in which the number of neurons (representing the input features) in the input layer is equal to that of the output layer and larger than the number of neurons composing the middle layers. This symmetric structure depicts an encoder that compresses the input into a latent low-dimensional space (z), and a decoder which attempts to reconstruct the original input from z. Let x be the original input and $\hat{x}$ be the reconstructed input. The Autoencoder attempts to learn an approximation of the identity function $h_{w,b}(x) \approx x$ which minimizes the reconstruction error (e.g., Mean Square Error (MSE)); w and b represent the weights and the biases of the neural network, respectively. FIG. 9 illustrates an example of the Autoencoder.

An Autoencoder can be used to profile benign network traffic and to detect any deviation as an anomaly at the edge node 19. Nonetheless, a major difficulty in profiling benign data only for anomaly detection lies in making the Autoencoder discover the boundaries between known (i.e., benign data) and unknown classes (i.e., anomalous data). When trained on benign data only, the Autoencoder learns the boundaries between the different classes in the trained data. Hence, it succeeds in reconstructing an input similar to the one which it learned, with a low reconstruction error. When tested on anomalous data different from the one it learned, the Autoencoder fails in reconstructing the latter which leads to a high reconstruction error depicting a divergence from the normal behavior. Thus, in order to identify such divergence, a threshold may be selected. If the reconstruction error for an input instance is above the identified threshold, the input is deemed anomalous. The threshold value can be determined by an analyst or may be a pre-programmed value selected based on certain criteria (e.g., threshold that maximizes the F1 score).

OE-Based Autoencoder, i.e., Local Autoencoder at Edge Node 19

When the Autoencoder is trained using benign data, it learns to reconstruct such data successfully, thus, resulting in low reconstruction error. Hence, it is unlikely that such Autoencoder will be able to successfully reconstruct anomalous data which was not used during its training. However, this is not always the case. It is also possible that some unseen input data (e.g., anomalous network traffic) results in low reconstruction error.

Such events will cause difficulty in determining a suitable threshold for anomaly detection. More precisely: 1) since there are some anomalous network traffic that results in low reconstruction error, a low threshold value may be selected which can lead to high False Positive Rate (FPR) (benign traffic detected as attack traffic), or 2) if a low FPR is desired and a higher value is selected for the threshold, the detection of the anomalies that have low reconstruction error, i.e., higher False Negative Rate (FNR), may be missed.

In order to overcome this issue, one or more embodiments described herein combine Autoencoder functionality with the advancement in OE. Unlike supervised intrusion detection methods that are trained on a significantly large number of attack and normal samples, and are able to classify samples similar to those they were trained on; OE-based Autoencoder described herein may account only for a limited class(es) of attacks and anomalous samples. The approach described herein may successfully generalize for other type of anomalies that were not seen by the Autoencoder during the training. This may be an advantage of OE as described herein. To accomplish this, one or more of the following modifications to the Autoencoder may be performed:

- Instead of training the Autoencoder only using a training dataset consisting of benign network traffic, some anomalous network traffic is added to the training set. This allows the Autoencoder to attain knowledge of the type of malicious inputs with high reconstruction errors it may observe.
- Changing the objective function of the Autoencoder in order to force it to assign a high reconstruction error for anomalous samples, while keeping low reconstruction error for benign network traffic. To apply OE to an Autoencoder, a neural network is trained in order to concentrate normal data around a predetermined center and map anomalous samples away from that center, as described in an existing work that extends Deep SAD.

Hence, the dataset $D=\{D^u, D^a\}$ as defined before is considered, where $D^u$ is a dataset of network traffic collected during normal network operation (unlabeled but mostly assumed to have benign network traffic), and $D^a$ is a dataset encompassing labelled anomalous samples. Also, the following is accounted for: $x_i \in \mathbb{R}^D$ that denotes the vector of normalized features generated by the feature engineering module and $y_i \in \{0,1\}$ is the label for each sample in D. The network traffic is anomalous if $y_i=1$, and benign otherwise. Although the samples of $D^u$ are unlabeled, the following is assigned $y_i=0$ to them as it is assumed that the number of anomalous samples in $D^u$ is very limited.

Denoting the Autoencoder reconstruction function by $\varphi(x_i)$, the modified objective function of the Autoencoder is composed of two terms:

a. Minimize $d(x_i)$ for all $x_i$:$y_i=0$ b. and maximize $d(x_i)$ for all $x_i$:$y_i=1$, where $d(x_i)$ is the MSE between $x_i$ and its reconstructed version $\varphi(x_i)$, $d(x_i)=$ $$\|\varphi(x_i)-x_i\|_2^2.$$

Such an objective function can be implemented using different loss functions. For example, the loss function can be defined as:

$$-\frac{1}{n}\sum_{i=1}^{n}(1-y_i)d(x_i)+y_i d(x_i)^{-1} \text{ or}$$

$$-\frac{1}{n}\sum_{i=1}^{n}(1-y_i)\log\rho(d(x_i))+y_i\log(1-\rho(d(x_i)),$$

where $\rho(x)$ is a non-increasing function with a value between 1 and zero; for example, $\rho(x)=\exp(-x)$ or $\rho(x)=\exp(-(\text{sqrt}(x+1)-1)$. The first term in both of the above objective functions tries to minimize the reconstruction error of the benign samples while the second term tries to maximize the reconstruction error of the OE samples.

In another example, the loss function can be defined as:

$$\text{loss}(W, D)=\frac{1}{|D|}\sum_{x_i,y_i\in D}\Gamma(x_i, y_i) \text{ where}$$

$$\Gamma(x_i, y_i)=-((1-y_i)\log\rho(d(x_i))+y_i\log(1-\rho(d(x_i))))$$

where:

$\rho(x)=\exp(-x)$ or $\rho(x)=\exp(-\sqrt{(x+1)}-1))$ is a non-increasing function with a value between zero and one; $d(x_i)$ is the Mean Squared Error, MSE, between $x_i$ and its reconstructed version $$\varphi(x_i),\ d(x_i)=\|\varphi(x_i)-x_i\|_2^2$$

W represents local Outlier Exposure-based autoencoder weights; and $D=\{(x_1, y_1), \ldots, (x_i, y_i)\}$ where $x_i$ is a vector of normalized features and $y_i \in \{0,1\}$ is a label.

Autoencoder Training Using FL

The OE-based Autoencoder objective function that is described herein is trained in a distributed manner using FL, where the edge nodes 19 represent the FL clients and the central cloud server (i.e., central node 17) represents the FL server. The architecture of the Autoencoder and the training hyper-parameters are hosted on the FL server. The Autoencoder training process starts when the FL server selects a subset of FL clients and shares with them the training information (i.e., architecture, hyper-parameters). The selected FL clients train the Autoencoder using their local training data. The training data encompasses the set of unlabeled network traffic collected during normal network operation (which is assumed to have mostly benign traffic), along with possibly labelled anomalous network traffic belonging to one or many anomaly classes. It may be assumed that at least one edge node possesses labelled anomalous network traffic so that the anomaly detection solution described herein benefits from the OE objective function, otherwise the anomaly detection solution may perform similar to a traditional Autoencoder.

Note that combining FL with Autoencoder and OE may allow to maximize the benefits obtained from OE as FL offers the possibility of exposing the Autoencoder to different anomalous samples that are hard to collect and label on a single edge server. Thus, by training the OE-based Autoencoder using FL, the anomaly detection described herein is capable of better differentiating anomalies and zero-day attacks from the benign network traffic.

The training of the OE-based Autoencoder continues through different rounds of training. Each round encompasses training of the model locally on each FL client, sharing the updated weights with the FL server that aggregates them using a predefined aggregation method (e.g., FedAvg), and sharing the aggregated weights with the FL clients in the next round. The process continues for a certain period of time that is available for training. The FL training can also be carried on by frequently getting the updates from the edge nodes to benefit from the new data that might be collected.

Figure 10:
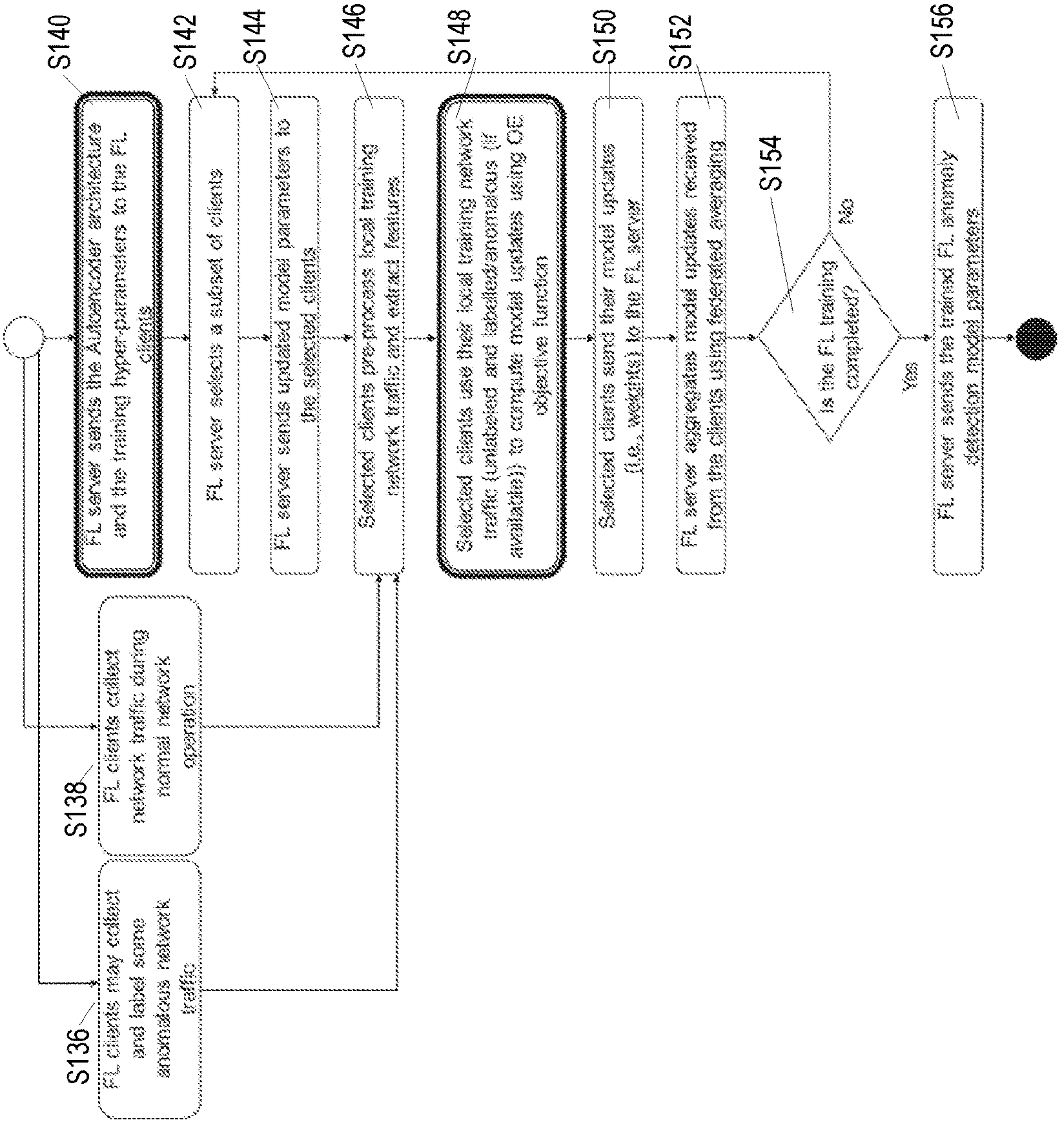
FIG. 10 is a flow diagram of a process associated with an OE-based autoencoder FL according to some embodiments of the present disclosure.

The OE-based Autoencoder training process using FL is depicted in the flowchart presented in FIG. 10. FL clients (e.g., distributed nodes 19) may collect and label (Block S136) some anomalous network traffic. FL clients collect (Block S138) network traffic during normal network operation. FL server 17 sends (Block S140) the autoencoder architecture and the training hyper-parameters to the FL clients. FL server 17 selects (Block S142) a subset of clients (e.g., FL clients). FL server 17 sends (Block S144) updated model parameters to the selected clients.

Selected clients pre-process (Block S146) local training network traffic and extract features. Selected clients use (Block S148) their local training network traffic (unlabeled and labeled/anomalous (if available)) to compute model updates using OE objective function. Selected clients send (Block S150) their model updates (i.e., weights) to the FL server 17. FL server 17 aggregates (Block S152) model updates received from the clients using federated averaging.

A determination is performed (Block S154) whether FL training is complete. If FL training is completed, FL server 17 sends (Block S156) the trained FL anomaly detection model parameters. If FL training is not completed, Block S142 is performed.

Online Anomaly Detection

Once the FL model (e.g., OE-based Autoencoder) is trained, it can be used for anomaly detection at each of the edge nodes 19 or any other node which contributed or not to the FL process. Such a node may download the trained Autoencoder and feed it with online network traffic pre-processed for feature extraction, as described in the "anomaly detection framework" above.

In an online anomaly detection scenario, the anomaly detection model will try to reconstruct the input sample depicted by the corresponding features and returns the reconstruction error $$\left(\text{i.e., } d(x_{test}) = \|\varphi(x_{test}) - x_{test}\|_2^2\right).$$

Based on a pre-selected threshold determined by the network operator, the input sample is classified as anomalous when the reconstruction error is larger than the threshold (i.e., $d(x_{test})$>threshold) and benign otherwise.

Figure 11:
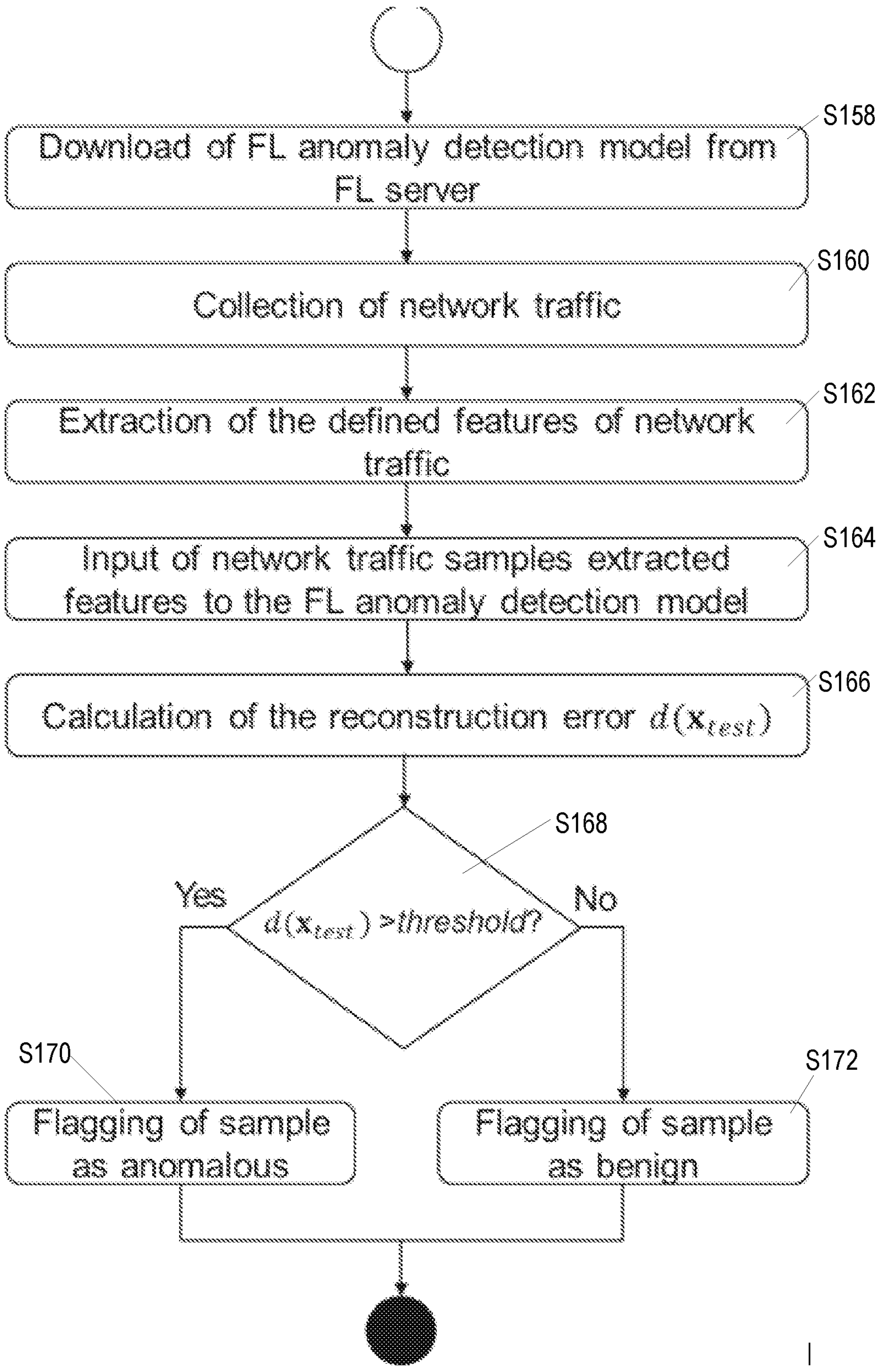
FIG. 11 is a flow diagram of an online anomaly detection process according to some embodiments of the present disclosure.

An example of the online anomaly detection process is represented in FIG. 11. Download of FL anomaly detection model from FL server 17 (Block S158). Collection of network traffic (Block S160). Extraction of the defined features of network traffic (Block S162). Input of network traffic samples extracted features to the FL anomaly detection model (Block S164).

Calculation of the reconstruction error $d(X_{test})$ (Block S166). A determination is performed whether $d(X_{test})$ is greater than a threshold (Block S168). If $d(X_{test})$ is greater than a threshold, flagging of sample of anomalous is performed (Block S170). If $d(X_{test})$ is less than a threshold, flagging of sample as benign is performed (Block S172).

Experimental Results

The anomaly detection solution described herein consists of an OE-based Autoencoder trained using the FL approach is validated as described herein. The CICDDoS2019 public dataset is used for the validation and experiments. Simulation results are then presented while emphasizing on the advantages brought by the FL solution presented herein in comparison to a cloud-centralized solution.

CICDDoS2019 Dataset

The CICDDoS2019 dataset includes 13 different DDoS attacks, carried out via application layer protocols over TCP/UDP. The dataset contains both raw packets of network traffic in PCAP format and flow-based features in CSV format, extracted using CICFlowMeter. The data is captured during two days, on January $12^{th}$ between 10:30 and 17:15 and on March $11^{th}$ between 09:40 and 17:35. Multiple reflection- and exploitation-based DDoS attacks are performed at different times.

Dataset Preparation

A scenario in which different edge nodes 19 (i.e., 3 edge nodes 19) are vulnerable to attacks and need to be protected by the anomaly detection solution presented herein, is described. Hence, the CICDDoS2019 dataset is manipulated to fit such a scenario. Thus, the CSV files provided by this dataset that include flow-based features for different benign and DDoS attacks flows are used.

In order to create a distributed dataset from the known CICDDoS2019 dataset to be used in FL, the CSV files provided by the CICDDoS2019 dataset were analyzed. A determination is made on the number of benign flows across these CSV files. Then, a subset of CSV files, those with the highest number of benign flows, are selected. From these selected files, the benign flows are extracted to create a new CSV file with only benign flows that will be used for training.

As a training dataset per edge node 19 (also referred to as edge servers) may be needed, the flows in the created benign CSV file are divided into three different training datasets (as three edge nodes 19 are considered in this experiment) of equal size based on the flow destination IP addresses. The choice of the destination IP addresses in order to divide the dataset follows the fact that flows are usually destined to an edge node 19 which has a group of dedicated IP addresses. Hence, to divide the created benign CSV file into three training datasets, the number of flows per destination IP address in this file are analyzed. The destination IP addresses are divided into three groups such that the number of flows across the groups is equal. Finally, the flows with destination IP addresses belonging to each group are added into the new CSV file which represents the training dataset of each edge node 19. Such a training dataset will be used to train the Autoencoder with/without OE in a FL setting.

To create the test dataset, the CSV files that were not used to extract the benign flows are considered, and are employed to show the performance of the anomaly detection solution described herein.

Finally, feature reduction is performed to the training and test datasets by removing some features such as the flow Id, source/destination IP, source/destination port. In addition, the features in these datasets are normalized.

The number of flows in the training and test datasets are presented in Table 1 and Table 2, respectively. Note that the number of benign flows in the benign CSV file created is represented by "Benign" in Table 1 and contains all the flows that were distributed across the edge nodes 19.

TABLE 1

Number of flows in the training datasets

| Training dataset | Number of benign flows |
|---|---|
| Benign | 95,631 |
| Edge 1 | 32,237 |
| Edge 2 | 31,898 |
| Edge 3 | 31,496 |

TABLE 2

Number of benign and attack flows in the attack datasets

| Test dataset | Number benign of flows | Number attack of flows |
|---|---|---|
| LDAP | 1,612 | 2,179,931 |
| NetBIOS | 1,707 | 4,093,280 |
| PortMap | 4,734 | 186,961 |
| SSDP | 763 | 2,610,612 |
| UDP lag | 3,705 | 366,901 |
| Syn | 392 | 1,582,290 |
| UDP | 2,157 | 3,134,646 |

Experimental Setup

Three FL clients (edge nodes 19) are accounted for where each of them has access to its own collected network traffic during the normal operation of the network (i.e., Edge1, Edge2 and Edge3 datasets), as described above. Additionally, it is assumed that the network administrator at each FL client is able to observe and flag a few samples of one attack type. For this experiment, it is assumed that Edge1, Edge2, and Edge3, each has access to 1K samples of Syn, SSDP and UDP DDoS attacks, respectively. The complete dataset of each FL client (i.e., the original datasets plus the outlier samples) are named Edge1_OE, Edge2_OE, and Edge3_OE. All FL clients and the FL server are implemented in separate virtual machines.

The anomaly detection model, as described above is an Autoencoder with the architecture of [79, 65, 45, 25, 10, 5, 10, 25, 45, 65, 79], where 79 is the size of the input features extracted from each flow and 5 is the size of the bottleneck layer of the Autoencoder. This model is sent from the FL server to each of the FL clients at the beginning of the training process. The FL server requests the FL clients to use the modified Autoencoder loss function and perform one round of training on their own data. The loss function that is used in this experiment is:

$$-\frac{1}{n}\sum_{i=1}^{n}(1-y_i)\log\rho(d(x_i)) + y_i\log(1-\rho(d(x_i))), \text{ where}$$

$$\rho(x) = \exp(-(sqrt(x+1)-1).$$

Figure 12:
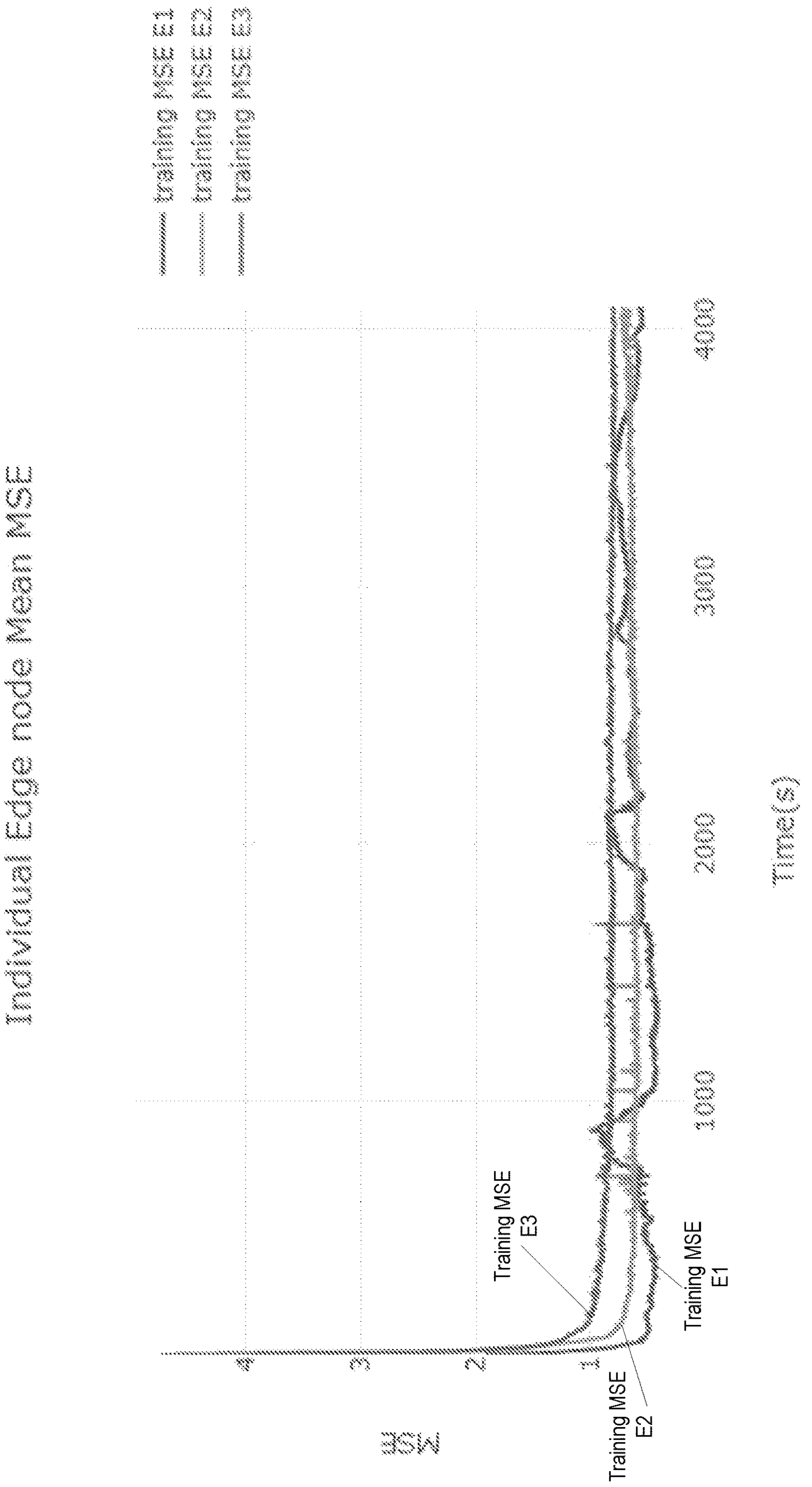
FIG. 12 is a diagram of a mean of the reconstruction error at each FL client according to some embodiments of the present disclosure.

After completing one round of training, the FL clients send their updates via a TCP connection to the FL server. The aggregated updates are sent back to the FL clients at the beginning of each round of training which results in gradual training of the model. FIG. 12 shows how the mean of the reconstruction error (for the normal traffic samples available in dataset) at each FL client decreases with FL training rounds. FL server in this implementation is aggregating FL clients updates based on FedAvg.

To demonstrate the benefits gained from using the approach described herein, the two cases of the FL with and without OE samples are compared. Also, in order to investigate what would happen if there were no privacy and communication cost constraints, the approach described herein is compared against two cloud-centralized cases. The comparison methods are as follows.

- FL with no OE: It is assumed that no OE is available at the edge nodes 19. Hence, the anomaly detection model is trained using the FL method by only incorporating the data collected during the normal operation of the network, i.e., benign samples of the network traffic.
- Centralized with no OE: It is assumed that no OE is available, instead all edge node 19 datasets are collected at a central location. If all data is at one location, the common Stochastic Gradient Descent (SGD) method may be used for training the Autoencoder.
- Centralized with OE: It is assumed that all the samples available at the edge nodes 19 have been transmitted to a central location and a common SGD method is used for training the Autoencoder. As the OE samples are also available, the Autoencoder uses the OE loss function for weight updates.
- FL with OE: This is the system model described herein in one or more embodiments. There are three edge nodes 19, each has access only to its own dataset (both benign and OE samples). FL is used for training which preserves the privacy and minimizes the communication cost.

Simulation Results

To compare the models of the above methods for all possible threshold values, the Receiver Operating Characteristic (RoC) curves are computed and each model is tested while considering different test cases (i.e., DDoS attacks). Note that each point in the RoC curve represents a tuple <FPR (False Positive Rate), TPR (True Positive Rate)> associated with a certain threshold. So, in general a better model is the one with a higher RoC curve than the other one (i.e., the one that is closer to the point <FPR=0, TPR=1>). Therefore, the Area Under the Curve (AUC) of the RoC curve is the metric used for comparing different models.

FIGS. 13-16 are diagrams that illustrate the results where the performance of different test cases have been tested. The AUC of each test case is added to the legend of FIGS. 13-16.

Figure 13:
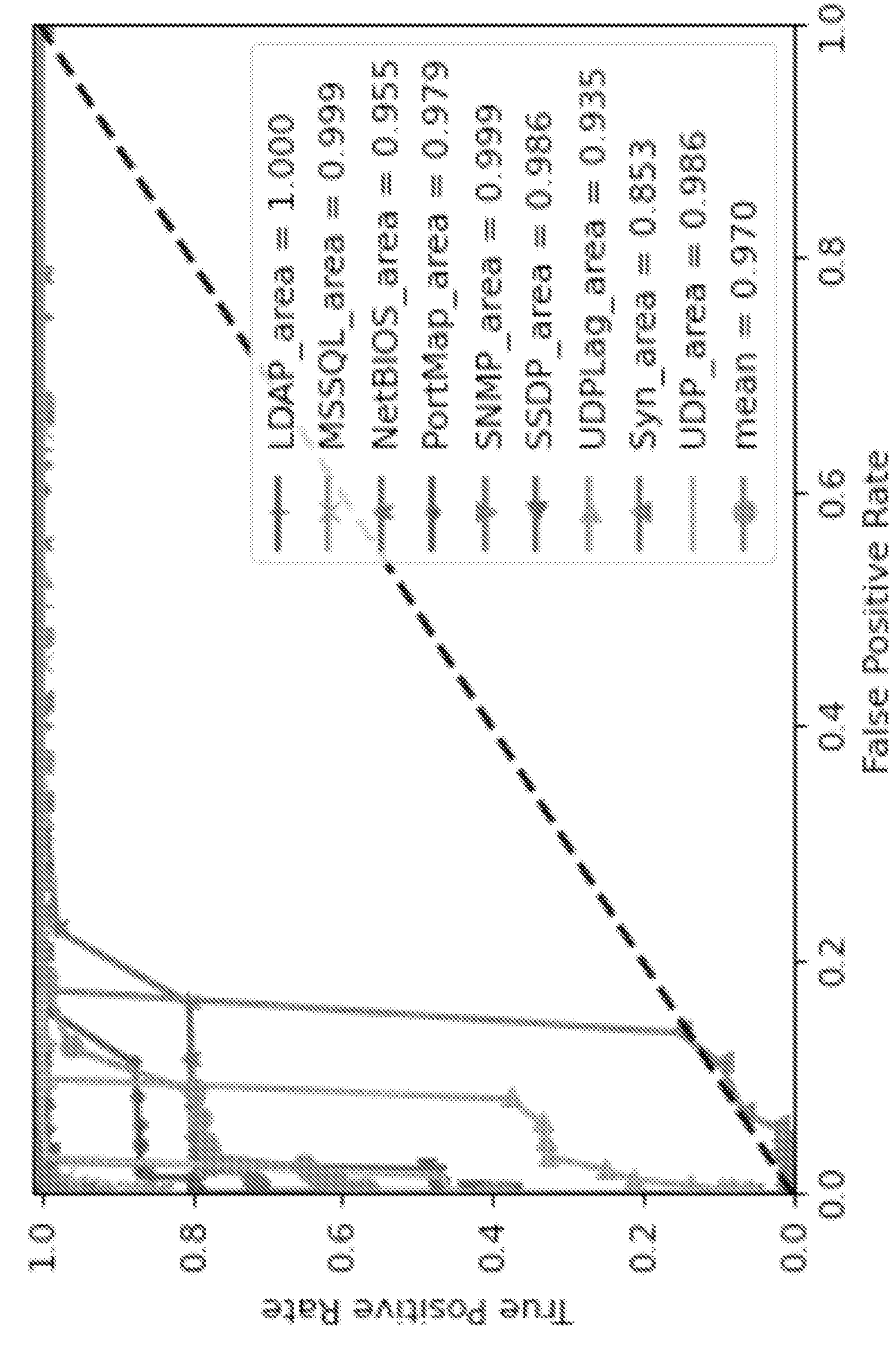
FIG. 13 is a diagram of a cloud-centralized example with no OE.
Figure 14:
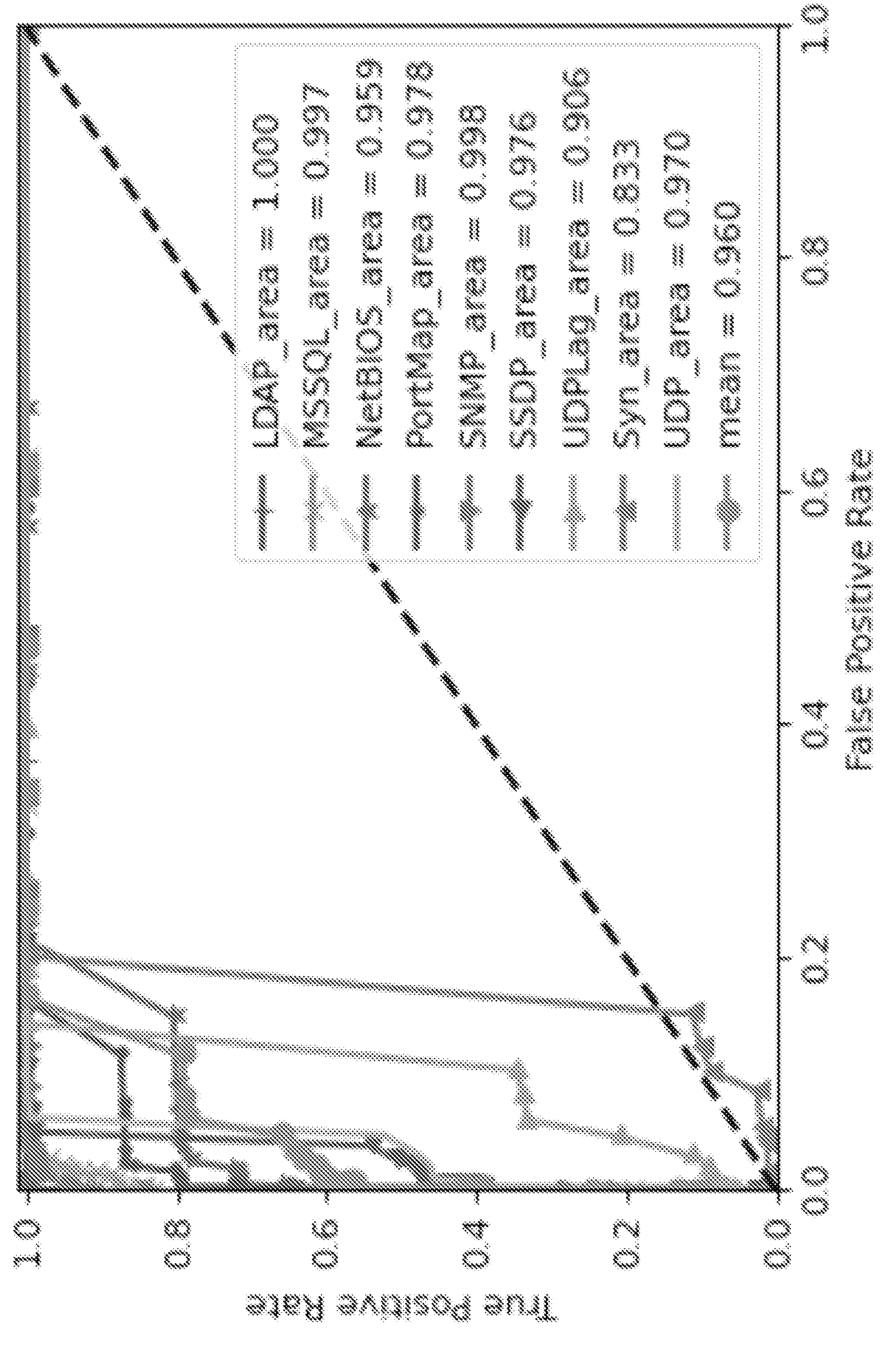
FIG. 14 is a diagram of a FL example with no OE.

FIGS. 13 and 14 show the result of centralized learning and FL when there are no outlier samples available for use. Note that, for the centralized approach, the Autoencoder using the Benign dataset is used, while for the FL approach Edge 1 (i.e., a first edge node 19), Edge 2 and Edge 3 datasets are used for the model training (Table 1). As illustrated, the FL performance is almost at par with the centralized performance, while it preserves privacy and reduces the communication cost by not sending the training data to the central node 17. Referring to FIGS. 13-14, it is illustrated that the trained anomaly detection model has very good performance for most of the test cases (i.e., the AUC is close to 1), but it fails to detect some cases, e.g., UDPLag and SYN attacks.

Figure 15:
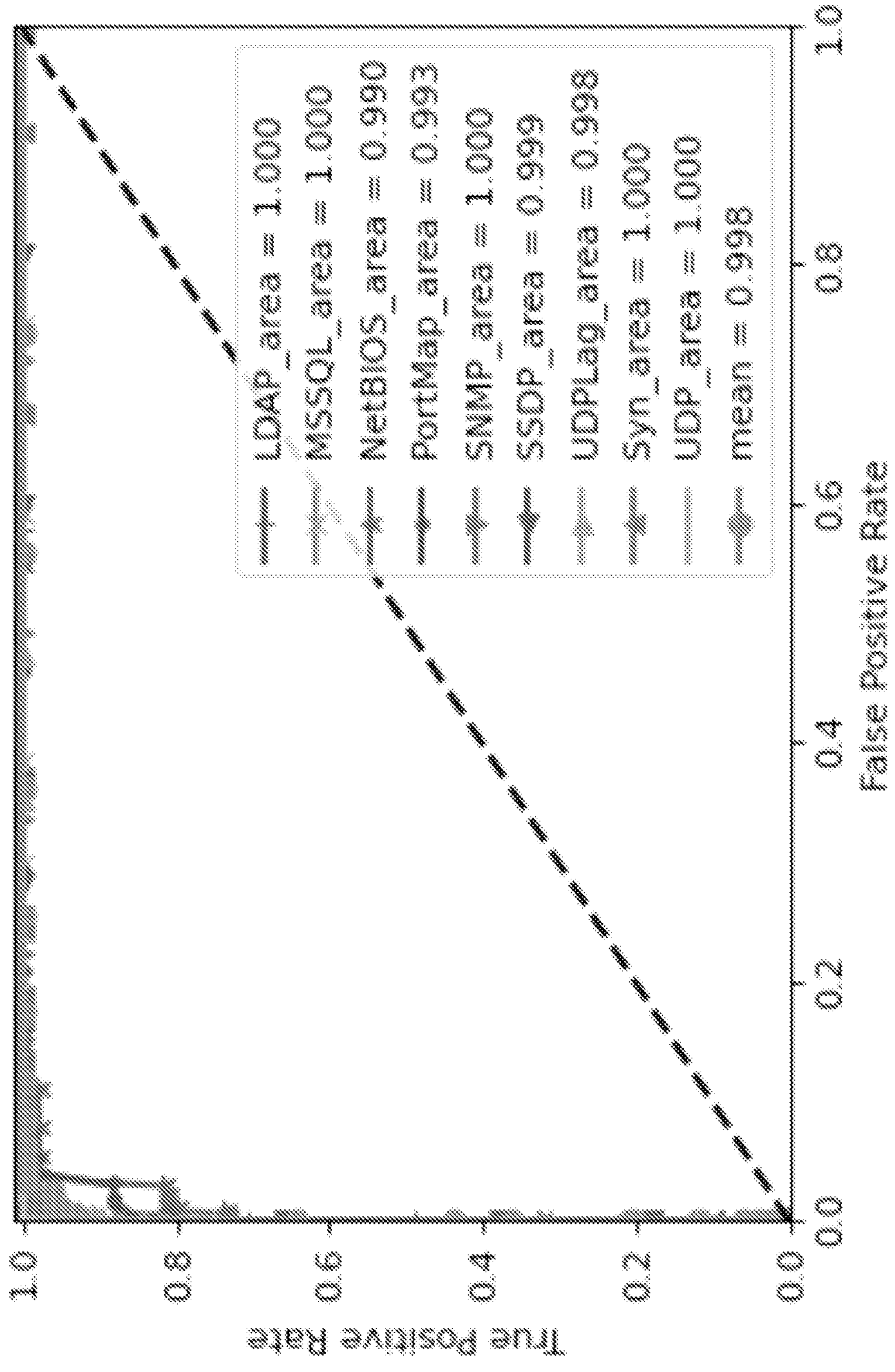
FIG. 15 is a diagram of a cloud-centralized example with OE.
Figure 16:
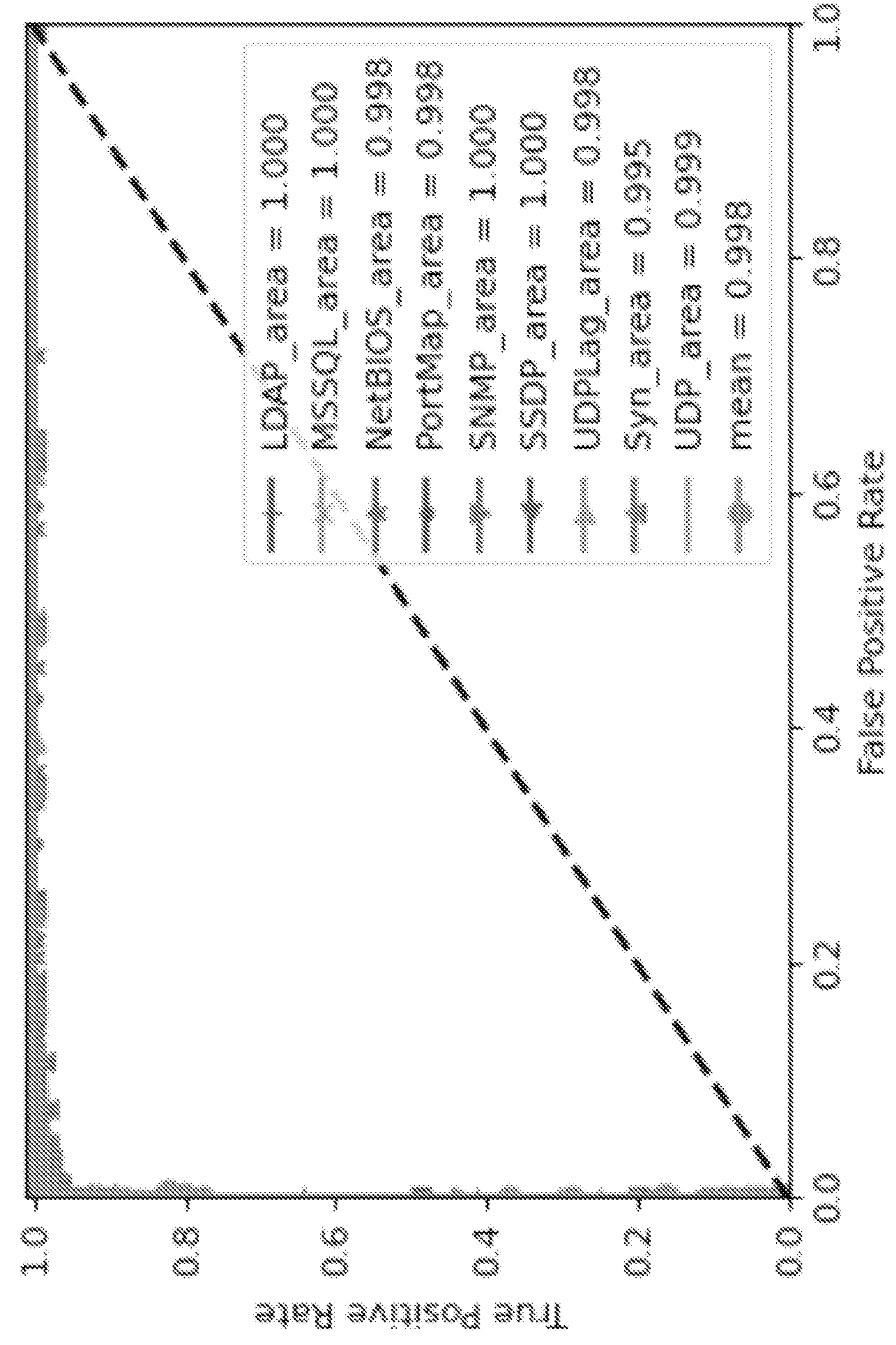
FIG. 16 is a diagram of a FL example with OE.

The results of the centralized and FL with OE case are illustrated in FIG. 15 and FIG. 16, respectively. As can be seen, the trained anomaly detection model now has very good performance in all cases including the UDPLag and SYN attacks. This improvement is the result of the Autoencoder with OE, as described herein, as it allows the FL model to take advantage of the outlier samples that exist in all FL clients.

The anomalous network traffic samples that are used as the OE samples are from the SYN, SSDP and LDAP attacks. So, since the Autoencoder has observed some samples of the SYN attack during the training phase, it is expected to notice improvement on the RoC curve associated with the SYN-attack dataset. Another observation is the considerable gain on UDPLag attack dataset. This confirms the hypothesis that having access to the outlier samples from one attack class can improve the detection accuracy of other classes of anomalous traffic as well. This is observed for similar attack types such as exploitation-based DDoS attacks.

Finally, FIGS. 15-16 are compared to verify that the FL method, described herein, has almost similar performance as the centralized one without compromising the network traffic privacy and the additional communication cost.

One or more embodiments of the present disclosure can be implemented in the 5G service-based architecture as part of the Network Data and Analytics Function (NWDAF) (Third Generation Partnership Project (3GPP) Technical Specification (TS) 23.288) without changes/additions to the 3GPP standard. One or more embodiments described herein provides detection of anomalies in 5G network through aggregating network traffic information from different network functions. Note that 3GPP TS 33.521 Clause 4.2.1.2.6 lists privacy requirements for NWDAF where the one or more embodiments described herein preserve privacy, i.e., meet the requirements for NWDAF.

Also, one or more embodiments described herein can also be implemented as part of the Network Function Virtualization (NFV) security management framework (e.g., ETSI GS NFV-SEC 013 V3.1.1). The virtual security functions can act as the FL clients (i.e., edge nodes 19) while the NFV security manager can represent the FL server (i.e., central node 17). Further, every trust domain could also have its FL client.

One or more embodiments described herein relate to the applicability of OE to an autoencoder and its usage for network traffic anomaly detection along with the benefits obtained by training the OE-based autoencoder using FL.

Therefore, one or more embodiments described herein relates to an anomaly detection solution that has one or more of:

Consists of a modified or specifically configured OE-based Autoencoder for anomaly detection.

Presents a scheme to use OE samples during the training of an ML model through FL.

Demonstrates how to leverage OE for an anomaly detection model training through FL as OE serves the purpose of FL in better sharing the attacks characteristics.

Employs a limited subset of OOD (e.g., anomalous) network traffic to train the OE-based Autoencoder.

Shares anomalous data characteristics across different nodes (i.e., FL clients) through the exchange of ML model updates (i.e., weights of the neural networks determined by each FL client).

OE based anomaly detection for Distributed Denial of Service (DDoS) and denial of service attack detection such as an OE-based autoencoder.

Acquires learning network traffic characteristics from different distributed network nodes 19 and/or edge nodes 19.

Determines an anomaly score for each newly acquired observation.

Detects an anomaly by determining if an anomaly score exceeds a determined threshold value where the anomaly score may be provided by, for example, the developed OE-based autoencoder.

Enhances an Autoencoder functionality by training it to better estimate the distribution of benign samples when allowing it to also observe a few anomalous samples.

Trains an Autoencoder to better distinguish anomalous from benign samples.

Forces an Autoencoder to assign high anomaly scores to newly acquired network traffic samples which deviate from benign samples in the training dataset.

Accounts for information exchange including but not limited to ML model hyper-parameters between distributed edge nodes 19 and a central node 17.

One or more embodiments described herein provides one or more of the following advantages:

Preserves data privacy at each edge node 19.

Reduces the cost of anomaly detection (i.e., reduced communication overhead and model training time) in the operator's network while increasing the detection accuracy in comparison to existing technologies, which usually fall in the category of centralized anomaly detection.

Assists the anomaly detection model in better estimating the distribution of the benign samples by incorporating a small number of anomalous samples during the model training.

Improves the detection accuracy of new anomalies (i.e., not used as part of the OE samples).

Shares anomaly detection knowledge between different edge nodes 19.

Leverages observed anomalies across edge node 19 to enhance the detection accuracy at the edge nodes 19.

Provides a first line of defense at the network edge against attacks.

Facilitates anomaly detection in any distributed network and not only at the network edge nodes 19.

EXAMPLES

Example A1. A central node 17 for communicating with a plurality of edge nodes 19, configured to, and/or comprising a communication interface 62 and/or comprising processing circuitry 64 configured to:

cause transmission of training information to the plurality of edge nodes 19 for local anomaly detection model training;

receive a plurality of model updates from the plurality of edge nodes 19, the plurality of model updates being based at least on the local anomaly detection model training;

aggregate weights associated with the plurality of model updates; and cause transmission of the aggregated weights to the plurality of edge nodes 19 for one of anomaly detection and additional anomaly detection model training.

Example A2. The central node 17 of Example A1, wherein the aggregated weights are configured for use with an outliner exposure, OE, based model with federated learning.

Example A3. The central node 17 of Example A1, wherein the aggregate weights are configured for use with an outlier exposure, OE, based model for network traffic anomaly detection.

Example A4. The central node 17 of Example A1, wherein the aggregated weights are configured for use with an outlier exposure, OE, based autoencoder for OE based anomaly detection.

Example A5. The central node 17 of any one of Examples A1-A4, wherein each of the plurality of model updates is based at least on benign network traffic used for local anomaly detection model training at a respective edge node 19.

Example A6. The central node 17 of Examples A1-A5, wherein at least one of the plurality of model updates of at least one respective edge node 19 is based at least on limited labelled attack traffic used for local anomaly detection model training.

Example B1. A method implemented in a central node 17 that is configured to communicate with a plurality of edge nodes 19, the method comprising: causing transmission of training information to the plurality of edge nodes 19 for local anomaly detection model training;

receiving a plurality of model updates from the plurality of edge nodes 19, the plurality of model updates being based at least on the local anomaly detection model training;

aggregating weights associated with the plurality of model updates; and causing transmission of the aggregated weights to the plurality of edge nodes 19 for one of anomaly detection and additional anomaly detection model training.

Example B2. The method of Example B1, wherein the aggregated weights are configured for use with an outliner exposure, OE, based model with federated learning.

Example B3. The method of Example B1, wherein the aggregate weights are configured for use with an outlier exposure, OE, based model for network traffic anomaly detection.

Example B4. The method of Example B1, wherein the aggregated weights are configured for use with an outlier exposure, OE, based autoencoder for OE based anomaly detection.

Example B5. The method of any one of Examples B1-B4, wherein each of the plurality of model updates is based at least on benign network traffic used for local anomaly detection model training at a respective edge node 19.

Example B6. The method of Examples B1-B5, wherein at least one of the plurality of model updates of at least one respective edge node 19 is based at least on limited labelled attack traffic used for local anomaly detection model training.

Example C1. A first edge node 19 configured to communicate with a central node 17, the first edge node 19 configured to, and/or comprising a radio interface and/or processing circuitry 76 configured to:

receive training information;

train a local anomaly detection model based at least on the training information;

transmit a first model update, the first model update being based at least on the local anomaly detection model training; and receive aggregated weights of a plurality of model updates for one of anomaly detection and additional anomaly detection model training, the plurality of model updates including the first model update, the plurality of model updates other than the first model update being associated with local anomaly detection model training at a plurality of edge nodes 19.

Example C2. The first edge node 19 of Example C1, wherein the first model update is based on an outliner exposure, OE, based model with federated learning.

Example C3. The first edge node 19 of Example C1, wherein the aggregate weights are configured for use with an outlier exposure, OE, based model for network traffic anomaly detection.

Example C4. The first edge node 19 of Example C1, wherein the aggregate weights are configured for use with an outlier exposure, OE, based autoencoder for OE based anomaly detection.

Example C5. The first edge node 19 of any one of Examples C1-C4, wherein each of the plurality of model updates is based at least on benign network traffic used for local anomaly detection model training at a respective edge node 19.

Example C6. The first edge node 19 of Examples C1-C5, wherein the first model update is based at least on limited labelled attack traffic used for local anomaly detection model training.

Example D1. A method implemented in a first edge node 19 that is configured to communicate with a central node 17, the method comprising:

receiving training information;

training a local anomaly detection model based at least on the training information;

transmitting a first model update, the first model update being based at least on the local anomaly detection model training; and receiving aggregated weights of a plurality of model updates for one of anomaly detection and additional anomaly detection model training, the plurality of model updates including the first model update, the plurality of model updates other than the first model update being associated with local anomaly detection model training at a plurality of edge nodes 19.

Example D2. The method of Example D1, wherein the first model update is based on an outliner exposure, OE, based model with federated learning.

Example D3. The method of Example D1, wherein the aggregate weights are configured for use with an outlier exposure, OE, based model for network traffic anomaly detection.

Example D4. The method of Example D1, wherein the aggregate weights are configured for use with an outlier exposure, OE, based autoencoder for OE based anomaly detection.

Example D5. The method of any one of Examples D1-D4, wherein each of the plurality of model updates is based at least on benign network traffic used for local anomaly detection model training at a respective edge node 19.

Example D6. The method of Examples D1-D5, wherein the first model update is based at least on limited labelled attack traffic used for local anomaly detection model training.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and sub-combination of these embodiments. Accordingly, all embodiments can be combined in any way and/or combination, and the present specification, including the drawings, shall be construed to constitute a complete written description of all combinations and sub-combinations of the embodiments described herein, and of the manner and process of making and using them, and shall support claims to any such combination or sub-combination.

Abbreviations that may be used in the preceding description include:

| Abbreviation | Explanation |
|---|---|
| 5G | Fifth Generation |
| AUC | Area Under the Curve |
| BS | Base Station |
| DDoS | Distributed Denial of Service |
| FPR | False Positive Rate |
| FNR | False Negative Rate |
| FedAvg | Federated Averaging |
| FL | Federated Learning |
| IoT | Internet of Things |
| ML | Machine Learning |
| MSE | Mean Square Error |
| MEC | Multi-access Edge Computing |
| OE | Outlier Exposure |
| OOD | Out-of-Distribution |
| ROC | Receiver Operating Characteristic |
| SGD | Stochastic Gradient Descent |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented by a central node that is configured to communicate with a plurality of distributed nodes, the method comprising:

training an Outlier Exposure (OE)-based autoencoder using unlabeled network data and labeled network attack data, the OE-based autoencoder being trained to reconstruct input data to minimize a reconstruction error on unlabeled network data and to maximize the reconstruction error on labeled network attack data;

using the trained OE-based autoencoder to determine a reconstruction error on network traffic; and detect, in local network traffic, an anomaly caused by a network attack, the detection comprising:

comparing the determined reconstruction error to a threshold; and determining the local network traffic to be an anomaly based on the comparison.

2. The method of claim 1, wherein the anomaly detection corresponds to distributed denial-of-service, DDoS, detection.

3. The method of claim 1, wherein an amount of the labeled network attack data used to train the Outlier Exposure-based autoencoder is less than an amount of the unlabeled network data used to train the Outlier Exposure-based autoencoder, the unlabeled network data and labeled network attack data being historical data.

4. The method of claim 1, wherein the unlabeled network data is unlabeled benign network data; and the labeled network attack data is limited labeled attack data.

5. The method of claim 1, further comprising:

causing transmission of training information to a plurality of distributed nodes for training a local OE-based autoencoder at each distributed node using local network data, the local OE-based autoencoder being trained to reconstruct input data to minimize a reconstruction error on network data of the local network data;

receiving a plurality Outlier Exposure-based autoencoder updates from the plurality of distributed nodes, the plurality of OE-based autoencoder updates being based on the training of the local OE-based autoencoder at each distributed node;

aggregating the plurality of Outlier Exposure-based autoencoder updates to generate an aggregated Outlier Exposure-based autoencoder update; and causing transmission of the aggregated Outlier Exposure-based autoencoder update to the plurality of distributed nodes for updating the local OE-based autoencoder at each of the plurality of distributed nodes for anomaly detection.

6. The method of claim 5, wherein the local OE-based autoencoder is trained to reconstruct input data to maximize the reconstruction error on network attack data of the local network data.

7. The method of claim 5, wherein the local network data corresponds to an amount of the network attack data that is less than an amount of the network data.

8. The method of claim 5, wherein the training information includes an Outlier-Exposure-based autoencoder structure, initial Outlier Exposure-based autoencoder weights and hyper parameters.

9. The method of claim 1, wherein the OE-based autoencoder is configured to reconstruct the input data in accordance with minimizing a loss function:

$$\text{loss}(W, D) = \frac{1}{|D|} \sum_{x_i, y_i \in D} \Gamma(x_i, y_i)$$

where $$\Gamma(x\_i, y\_i) = -((1 - y_i) \log \rho\,(d(x_i)) + y_i \log(1 - \rho(d(x_i))))$$

where:

$\rho(x)=\exp(-x)$ or $\rho(x)=\exp(-(\sqrt{(x+1)}-1))$ is a non-increasing function with a value between zero and one;

$d(x_i)$ is the Mean Squared Error, MSE, between $x_i$ and its reconstructed version $$\varphi(x_i),\ d(x_i) = \|\varphi(x_i) - x_i\|_2^2$$

W represents Outlier Exposure-based autoencoder weights;

$D=\{(x_1,y_1), \ldots, (x_i,yi_i)\}$ where $x_i$ is a vector of normalized features and $y_i \in \{0,1\}$ is a label;

a first term in Γ(xi,yi) is configured to minimize the reconstruction error on the unlabeled network data; and a second term in Γ(xi,yi) is configured to maximize the reconstruction error on the labeled network attack data.

10. A method implemented by a central node that is configured to communicate with a plurality of distributed nodes, the method comprising:

training an Outlier Exposure (OE)-based autoencoder using unlabeled network data and labeled network attack data, the OE-based autoencoder being trained to reconstruct input data to minimize a reconstruction error on unlabeled network data and to maximize the reconstruction error on labeled network attack data;

causing transmission of training information to a plurality of distributed nodes for training a local Outlier Exposure-based autoencoder at each distributed node using local network data, the training information being based at least on the trained OE-based autoencoder; and receiving one or more Outlier Exposure-based autoencoder updates from the plurality of distributed nodes, the one or more OE-based autoencoder updates being based on the training of the local OE-based autoencoder at each distributed node.

11. The method of claim 10, further comprising:

aggregating the plurality of Outlier Exposure-based autoencoder updates to generate an aggregated Outlier Exposure-based autoencoder update; and causing transmission of the aggregated Outlier Exposure-based autoencoder update to the plurality of distributed nodes for updating the local OE-based autoencoder at each of the plurality of distributed nodes for anomaly detection.

12. The method of claim 10, wherein the local OE-based autoencoder is trained to reconstruct input data to minimize a reconstruction error on network data of the local network data.

13. The method of claim 10, wherein the local OE-based autoencoder is trained to reconstruct input data to maximize the reconstruction error on network attack data of the local network data.

14. The method of claim 10, wherein the local network data corresponds to an amount of the network attack data that is less than an amount of the network data.

15. The method of claim 10, wherein the training information includes an Outlier-Exposure-based autoencoder structure, initial Outlier Exposure-based autoencoder weights and hyper parameters.

16. The method of claim 10, wherein the training of the local Outlier Exposure-based autoencoder is based at least in part on local network attack data associated with a respective distributed node.

17. The method of claim 10, further comprising:

using the trained OE-based autoencoder to determine a reconstruction error on network traffic associated with the central node; and comparing the determined reconstruction error to a threshold to determine if the network traffic associated with the central node is an anomaly.

18. The method of claim 10, wherein the OE-based autoencoder is configured to reconstruct the input data in accordance with minimizing a loss function:

$$\text{loss}(W, D) = \frac{1}{|D|} \sum_{x_i, y_i \in D} \Gamma(x_i, y_i)$$

where $$\Gamma(\text{x\_i, y\_i}) = -((1 - y_i)\log\rho(d(x_i)) + y_i \log(1 - \rho(d(x_i))))$$

where:

$\rho(x)=\exp(-x)$ or $\rho(x)=\exp(-(\sqrt{(x+1)}-1))$ is a non-increasing function with a value between zero and one;

$d(x_i)$ is the Mean Squared Error, MSE, between $x_i$ and its reconstructed version $$\varphi(x_i),\ d(x_i) = \|\varphi(x_i) - x_i\|_2^2$$

W represents Outlier Exposure-based autoencoder weights;

$D=\{(x_1,y_1), \ldots, (x_i,y_i)\}$ where x; is a vector of normalized features and $y_i \in \{0,1\}$ is a label;

a first term in Γ(xi,yi) is configured to minimize the reconstruction error on unlabeled network data; and a second term in Γ(xi,yi) is configured to maximize the reconstruction error on labeled network attack data.

19. The method of claim 10, wherein an amount of the labeled network attack data used to train the Outlier Exposure-based autoencoder is less than an amount of the unlabeled network data used to train the Outlier Exposure-based autoencoder, the unlabeled network data and labeled network attack data being historical data.

20. The method of claim 10, wherein the unlabeled network data is unlabeled benign network data; and the labeled network attack data is limited labeled attack data.

21. The method of claim 10, wherein the anomaly detection corresponds to performing distributed denial-of-service, DDoS, detection.

22. A method implemented by a first distributed node, the method comprising:

receiving training information from a central node;

training a local Outlier Exposure (OE)-based autoencoder model using local unlabeled network data and the training information, the local OE-based autoencoder being trained to reconstruct input data to:

minimize a reconstruction error on local unlabeled network data of local network traffic; and maximize the reconstruction error on labeled network attack data of the local network traffic;

using the trained local OE-based autoencoder model to determine a reconstruction error on the local network traffic; and detecting, in local network traffic, an anomaly caused by a network attack, the detection comprising:

comparing the determined reconstruction error to a threshold; and determining the local network traffic to be an anomaly based on the comparison.

23. The method of claim 22, further comprising:

causing transmission of a local OE-based autoencoder update that is based at least on the local OE-based autoencoder training.

24. The method of claim 23, further comprising receiving an aggregated OE-based autoencoder update, the aggregated OE-based autoencoder update being based on a plurality of OE-based autoencoder updates from a plurality of distributed node including the first distributed node, the aggregated OE-based autoencoder update being for one of anomaly detection and additional local OE-based autoencoder training.

25. The method of claim 24, wherein the aggregated OE-based autoencoder update includes aggregated weights of a plurality of local OE-based autoencoders associated with the plurality of distributed nodes.

26. The method of claim 22, wherein the training of the local OE-based autoencoder further uses local labeled network attack data.

27. The method of claim 22, wherein the local network data corresponds to an amount of labeled network attack data that is less than an amount of the unlabeled network data.

28. The method of claim 22, wherein the training information includes an Outlier-Exposure-based autoencoder structure, initial Outlier Exposure-based autoencoder weights and hyper parameters.

29. The method of claim 22, wherein the local OE-based autoencoder is configured to reconstruct the input data in accordance with minimizing a loss function:

$$\text{loss}(W, D) = \frac{1}{|D|} \sum_{x_i, y_i \in D} \Gamma(x_i, y_i)$$

where $$\Gamma(\text{x\_i, y\_i}) = -((1 - y_i)\log\rho(d(x_i)) + y_i \log(1 - \rho(d(x_i))))$$

where:

$\rho(x)=\exp(-x)$ or $\rho(x)=\exp(-(\sqrt{(x+1)}-1))$ is a non-increasing function with a value between zero and one;

$d(x_i)$ is the Mean Squared Error, MSE, between $x_i$ and its reconstructed version $$\varphi(x_i),\ d(x_i) = \|\varphi(x_i) - x_i\|_2^2$$

W represents local Outlier Exposure-based autoencoder weights;

$D=\{(x_1,y_1), \ldots, (x_i,y_i)\}$ where $x_i$ is a vector of normalized features and $y_i \in E$ {0,1} is a label;

a first term in Γ(xi,yi) is configured to minimize the reconstruction error on the unlabeled network data; and a second term in Γ(xi,yi) is configured to maximize the reconstruction error on labeled network attack data.

* * * * *